(12) United States Patent
Edgar et al.

(10) Patent No.: US 12,492,448 B2
(45) Date of Patent: Dec. 9, 2025

(54) METHODS FOR THE SEPARATION AND/OR PURIFICATION OF METALS

(71) Applicant: JOHNSON MATTHEY PUBLIC LIMITED COMPANY, London (GB)

(72) Inventors: Jonathan Edgar, Billingham (GB); Daniel Marin Florido, Reading (GB); David Foxwell, Enfield (GB); Paul Noel O'Shaughnessy, Reading (GB); Andreas Tsoligkas, Enfield (GB)

(73) Assignee: Johnson Matthey Public Limited Company, London (GB)

( * ) Notice: Subject to any disclaimer, the term of this patent is extended or adjusted under 35 U.S.C. 154(b) by 475 days.

(21) Appl. No.: 17/995,656

(22) PCT Filed: Apr. 28, 2021

(86) PCT No.: PCT/GB2021/051022
§ 371 (c)(1),
(2) Date: Oct. 6, 2022

(87) PCT Pub. No.: WO2022/013518
PCT Pub. Date: Jan. 20, 2022

(65) Prior Publication Data
US 2023/0175097 A1   Jun. 8, 2023

(30) Foreign Application Priority Data
Jul. 15, 2020   (GB) .................................... 2010885

(51) Int. Cl.
*C22B 11/00*   (2006.01)
*B01D 15/16*   (2006.01)
(Continued)

(52) U.S. Cl.
CPC .......... *C22B 11/046* (2013.01); *B01D 15/166* (2013.01); *B01D 15/265* (2013.01);
(Continued)

(58) Field of Classification Search
CPC .......... C22B 11/046; C22B 3/24; C22B 3/26; C22B 3/42; C22B 11/04; C22B 26/12;
(Continued)

(56) References Cited

U.S. PATENT DOCUMENTS

| 4,105,742 A | 8/1978 | Edwards et al. |
| 4,885,143 A | 12/1989 | Schmuckler |

(Continued)

FOREIGN PATENT DOCUMENTS

| CN | 108486364 A | 9/2018 |
| JP | 2011041918 A1 | 3/2011 |

(Continued)

OTHER PUBLICATIONS

Jorge C. Masini et.al. ["Porous monoliths for on-line sample preparation: A review", Analytica Chimica Acta 964 (2017) 24-44]. (Year: 2017).*

(Continued)

*Primary Examiner* — Sally A Merkling
*Assistant Examiner* — Nazmun Nahar Shams
(74) *Attorney, Agent, or Firm* — BakerHostetler

(57) ABSTRACT

A method for separating at least two metals from each other in a metal refining process, the method comprising: injecting a feed solution comprising the metals into a column or flow pipe comprising a monolithic solid body having a plurality of channels; and flowing the feed solution through the plurality of channels in the monolithic solid body to separate the metals.

5 Claims, 17 Drawing Sheets

(51) Int. Cl.
  *B01D 15/26* (2006.01)
  *C22B 3/24* (2006.01)
  *C22B 3/26* (2006.01)
  *C22B 3/42* (2006.01)

(52) U.S. Cl.
  CPC ............... *C22B 3/24* (2013.01); *C22B 3/26* (2021.05); *C22B 3/42* (2013.01)

(58) Field of Classification Search
  CPC ............ B01D 15/166; B01D 15/265; B01D 11/0223; B01D 11/028; B01D 11/0453; B01D 11/0488; B01D 15/22; B01D 17/0208; B01D 11/00; Y02P 10/20; B01J 20/264; B01J 20/267; B01J 20/28042; B01J 20/3007
  USPC .................................................. 75/744, 711
  See application file for complete search history.

(56) References Cited

U.S. PATENT DOCUMENTS

| | | | |
|---|---|---|---|
| 10,864,461 | B2 | 12/2020 | Parmentier |
| 2002/0179528 | A1 | 12/2002 | Sando et al. |
| 2013/0089477 | A1 | 4/2013 | Uehara |
| 2015/0306567 | A1 | 10/2015 | Johnson |

FOREIGN PATENT DOCUMENTS

| | | |
|---|---|---|
| JP | 2012171939 A | 9/2012 |
| JP | 2014133227 A | 7/2014 |
| WO | 96/28251 A1 | 9/1996 |
| WO | 03/093515 A1 | 11/2003 |
| WO | 2004/019071 A2 | 3/2004 |
| WO | 2007/144877 A2 | 12/2007 |
| WO | 2015/060367 A1 | 4/2015 |
| WO | 2016/050789 A1 | 4/2016 |
| WO | 2019/008232 A1 | 1/2019 |
| WO | 2021/034180 A1 | 2/2021 |

OTHER PUBLICATIONS

Moyna, et al., "Separation of selected transition metals by capillary chelation ion chromatography using acetyl-minodiacetic acid modified capillary polymer monoliths", Journal of Chromatography A, vol. 1249, pp. 155-163, 2012.

Scancar, et al., "Monolithic chromatography for elemental and speciation analysis", TrAC Trends in Analytical Chemistry, vol. 28, Issue 9, pp. 1048-1056, Oct. 2009.

Sanchez, et al., "Separation of some platinum group metal chelates with 8-hydroxyquinoline by various high-performance liquid chromatographic methods", J Chromatogr A, vol. 871(1-2), pp. 217-226, 2000.

Peroni, et al., "Hydrophobic polymer monoliths as novel phase separators: application in continuous liquid-liquid extraction systems", Anal Chim Acta, vol. 720, pp. 63-70, 2012.

Lahtinen, et al., "Selective Recovery of Gold from Electronic Waste Using 3D-Printed Scavenger", ACS Omega, vol. 2, pp. 7299-7304, 2017.

Lahtinen, et al., "Porous 3D Printed Scavenger Filters for Selective Recovery of Precious Metals from Electronic Waste", Advanced Sustainable Systems, vol. 2, 2018.

* cited by examiner (A) Platinum Recovery (B) Iridium Recovery

METHODS FOR THE SEPARATION AND/OR PURIFICATION OF METALS

FIELD

The present specification relates to methods for the separation and/or purification of metals in a feed solution. Examples include the separation of platinum group metals (PGMs) from each other and from associated base metal (BM) and/or amphoteric elements and/or gold (Au) contained in PGM feed solutions. Further examples relate to the separation and/or purification of metals used in batteries as part of a battery materials recycling process (e.g. cobalt, nickel, lithium, and manganese).

BACKGROUND

Several different methodologies are available for the separation and/or purification of metals in a feed solution. These can be broadly classified into two groups: (i) solid phase extraction; and (ii) liquid-liquid extraction.

In a solid phase extraction technique, the feed solution is passed through a column or flow pipe in which a solid phase extractant material is disposed. FIG. 1 shows a prior art solid phase extraction column 2. The solid phase extractant material 4 may comprise, for example, a solid material which has surface functionalization to preferentially adsorb one or more metal containing species. The solid phase extractant material is in the form of a powder, granules, or beads and is packed into a column through which the feed solution is passed. A porous frit 6 is provided to hold the solid phase extractant material in place. Target metal containing species are adsorbed onto the solid phase extractant material 4 while other metal species remain in solution. The metal containing species adsorbed onto the solid phase extractant 4 can subsequently be desorbed from the solid phase extractant, e.g. by washing with a suitable eluent.

An example of such a solid phase extraction technique is the chromatographic separation of PGM elements. In such methods, a chromatographic column can be prepared by packing with a suitable chromatographic support media. A number of different types of media are known in the art. Examples include methacrylate polymers. Once prepared, a PGM containing feed solution is injected into the chromatography column comprising the chromatographic support media. Typically, feed solutions can comprise at least two platinum group metals and at least one base metal and/or amphoteric element and/or Au. The feed is then eluted from the column in an elution cycle by flowing an eluent through the column. Examples of suitable eluents include concentrated solutions of halide salts or acids, e.g. HCl, NaCl, or LiCl. One option is to use concentrated HCl at concentrations in a range of around 5.5 M to 6.5 M. Different species have different retention times in the column, and thus multi-component separation can be achieved with products collected sequentially with high purity.

This technique can be applied to a variety of PGM and base metal mixtures and can achieve a number of different separation variants depending on the feed solution composition, chromatographic support media, and eluent. One important example is the separation of palladium and platinum from each other and from insoluble metals (IMs, e.g. Rh, Ir and Ru). This is typically performed on feeds that have been dissolved in a chloride matrix and after removal of gold, iron and other later eluting impurities.

Several problems exist with the use of traditional solid phase extraction techniques when applied to metal separation and purification methods. In this regard, it may be noted that metal separation and purification methods often employ extremely aggressive chemical processes which may involve the use of highly reactive and/or concentrated chemicals, such as highly concentrated inorganic acids and/or highly concentrated halide eluents. Such chemical processes can attack solid phase extractants causing degradation and/or deactivation of the solid phase extractant.

Additionally, or alternatively, the eluents used in such metal extraction processes can de-stabilize the solid phase extractant media packed into a separation column due to expansion or contraction of the powdered/granular/beaded solid phase extractant media. This is a particular problem when using extremely different types or concentrations of eluents, e.g. using eluents having widely different pH. Typical polymer chromatographic support medias used in metal (e.g. PGM) separation techniques contract in volume as the concentration of eluent is reduced and this adversely effects retention times and separation of metal components.

Further still, another problem with prior art methods is that the time to elute all metal (e.g. PGM) species from a column packed with solid phase extractant media can be long, resulting in long elution cycle times.

Yet another problem with the prior art methods is that certain metal species elute over a broad time band which increases the volume of eluent required to collect these species. This results in a very dilute metal product solution. Bands are typically characterised by so called "shock fronts" of high concentration followed by long peak "tails" or dispersive fronts. These are determined from the shape of the Langmuir type isotherm which is the governing factor for peak shape in overloaded/non-linear chromatography.

The aforementioned characteristics lead to low concentration products and increased cycle times, which reduces the productivity of the process. This has the effect of limiting the economic viability of any scaled-up industrial process using this methodology.

Some of these problems can be mitigated using gradient chromatography techniques. For example, in a PGM separation technique, starting the elution using a high concentration eluent (e.g. 6 M HCl) enables base metals and insoluble metals (IMs, e.g. Ru, Ir, Ru) to be eluted quickly from the column. Subsequently reducing the concentration of eluent (e.g. to 0.1M HCl) has been found to speed up the elution of later eluting components and also to narrow the elution bands. As such, the time required for the elution cycle is reduced and the concentration of product solutions is increased reducing evaporation requirements. It has also been found that the method reduces the diameter of the required column and enables a wider range of PGM separations to be practically achieved while significantly improving the scale-up economics of such processes.

While gradient chromatography methods have been used in other fields of technology such as pharmaceutical applications, the present inventors are not aware of this problem having been identified by others in the field of PGM separation and purification or any indication that such chromatography techniques would be useful in improving such techniques. One reason for this is that it is not straight forward to apply a gradient chromatography technique to PGM separation methods. As previously indicated, very concentrated halide eluents are used in such processes (e.g. 6 M HCl). Significantly reducing the concentration of the eluent (e.g. to <1 M HCl) during the elution cycle has been found to de-stabilize the chromatography support media. Typical polymer chromatographic support medias used in PGM separation techniques contract in volume as the concentration of eluent is reduced and this adversely effects retention times and separation of PGM components. This is less of a problem using standard PGM separation techniques in which the eluent is maintained at a single concentration during elution (i.e. isocratic). However, it is a barrier to the application of gradient chromatography in PGM separation techniques. Even using an isocratic approach, the physical structure and stability of the packed solid phase extractant can be problematic in terms of flow rates, adsorption efficiency and/or consistency, and pressure drop across the solid phase media through which the metal containing solutions are passed.

It is an aim of the present invention to provide systems and methodologies which enable improved solid-phase extraction for the separation and/or purification of metals such as platinum group metals and battery materials. A combination of increased flow rate, reduced pressure drop, increased extraction rate, improved separation/purification of different metal species, decreased metal losses, and increased stability of the solid phase extractant media is desired.

In contrast to the solid phase extraction techniques discussed above, in a liquid-liquid extraction technique the feed solution is mixed with an immiscible liquid extractant in which one or more metal containing species preferentially dissolve. FIG. 2 shows a prior art liquid-liquid extraction configuration comprising a mixing chamber 20 and a settling tank 21. The feed solution 22 may be an aqueous liquid and the immiscible liquid 24 may be an organic solvent or vice versa. An impeller 26 and motor 28 can be utilized to mix the liquids in the mixing chamber 20. After mixing, the mixture 30 of feed solution and liquid extractant is passed to the settling tank 21 and allowed to settle back into aqueous and organic layers 32, 34 in order to achieve separation and purification of one or more metal containing species in the liquid extractant. Multiple liquid-liquid extractions may be performed to achieve multi-component separation of products with high purity.

As described above, a traditional liquid-liquid extraction process comprises a mixing cell followed by a settling zone. The immiscible liquids are mixed in the mixing cell using an impeller which breaks the extractant phase (e.g. organic solvent) into small droplets and contacts them with the continuous feed solution phase (e.g. aqueous solution). This process will typically produce droplets of varying size include a proportion of droplets with a micron scale diameter. The mixed phases are then allowed to settle in a settling area. Smaller droplets coalesce more slowly than larger droplets and this dictates the size of the settling area and the settling time. The settling area can vary from a few meters to the size of a swimming pool, depending on the droplet size and flowrate. Some droplets of the extractant phase remain as entrainment in the continuous feed solution phase and require further processing to achieve separation.

Several problems exist with the use of traditional liquid-liquid extraction techniques when applied to metal separation and purification methods. In this regard, it may be noted that there are three well documented processes in liquid-liquid extraction: gravity mixer settlers; centrifugal phase separators; and rotating disc contactors. Conventional mixer settlers form small droplets that require large settling areas and/or long settling times. Centrifugal phase separators and rotating disc contactors are expensive, limited in terms of their materials of construction (which may prevent their use in certain applications), and difficult to maintain with limited vendors.

It is an aim of the present invention to provide systems and methodologies which enable improved liquid-liquid extraction for the separation and/or purification of metals such as platinum group metals and battery materials. A combination of increased rate of separation, improved separation/purification of different metal species, decreased metal losses, increased simplicity and robustness (e.g. reduction and/or no moving mechanical parts), reduced footprint, and reduced operating costs is desired.

SUMMARY OF INVENTION

The present inventors have found that the problems associated with both solid phase extraction and liquid-liquid extraction of metal species in a feed solution can be addressed by using a monolithic (e.g. 3D printed, casted, or moulded) solid phase body comprising a plurality of channels through which the metal containing feed solution is passed to extract one or more target metal species from the feed solution.

A method for separating at least two metals from each other in a metal refining process is thus provided, the method comprising:
  injecting a feed solution comprising the metals into a column or flow pipe comprising a monolithic solid body having a plurality of channels; and
  flowing the feed solution through the plurality of channels in the monolithic solid body to separate the metals.

In accordance with this specification, a monolithic solid phase body is a single, continuous, bonded, solid body comprising a plurality of channels through which the feed solution can flow. Such a monolithic solid phase body can be formed by conventional casting/moulding techniques or using 3D printing techniques. This contrasts with the conventional approach to metal extraction using a separation column packed with a powdered, granular, or beaded solid phase media which comprises a plurality of unbonded particles. Even if some bonding is present in such conventional particulate bodies, they are clearly discernible as comprising a plurality of individual particles and the channels provided between the particles are random or semi-random in size, configuration, and accessibility to fluid flow.

Surprisingly, it has been found that a monolithic solid phase body can be used to enhance both solid-phase extraction and liquid-liquid extraction of metal species in a feed solution as discussed below.

For solid phase extraction, metal containing feed solution is passed through the plurality of channels in the monolithic solid phase body, and one or more target metal species are adsorbed onto the interior surface(s) of the monolithic solid phase body forming the channels. In this regard, the interior surfaces of the monolithic solid phase body can be functionalized to preferentially adsorb one or more target metal containing species. As such, this specification also provides a method of fabricating a functionalized monolithic solid body comprising a plurality of channels for use in a metal separation method and/or a metal refining process. The method for fabricating the functionalized monolithic solid body comprises:
  contacting a monolithic solid body comprising a plurality of channels with a reagent selected to react with the monolithic solid body to form a surface functionalization which selectively adsorbs one or more target metal containing species; and
  enabling the reagent to flow through the plurality of channels in the monolithic body with sufficient residence time for a reaction to take place whereby a surface of the monolithic solid body within the channels is functionalized to selectively adsorb one or more target metal containing species.

The method may be achieved by placing a pre-formed monolith in a suitable reagent solution and retaining the monolith within the reagent solution for a suitable time to allow the reagent to flow through the channel structure of the monolith and react with the surface of the monolith within the channel structure to achieve surface functionalization. Alternatively, the reagent may be actively flowed through the pre-formed monolith to functionalize the monolith. In this arrangement, the fabrication method comprises:

locating a monolithic solid body comprising a plurality of channels in a flow apparatus; and flowing a reagent through the plurality of channels in the monolithic body at a flow rate to allow sufficient residence time for a reaction to take place whereby a surface of the monolithic solid body within the channels is functionalized to selectively adsorb one or more target metal containing species.

Using such a functionalized monolithic body, target metal containing species can be adsorbed onto the solid phase extractant material while other metal species remain in solution. The metal containing species adsorbed onto the solid phase extractant can subsequently be desorbed from the solid phase extractant, e.g. by washing with a suitable eluent.

It has been found that such monolithic solid phase bodies are more stable for use in metal separation and purification methods which employ extremely aggressive chemical processes involving the use of highly reactive and/or concentrated chemicals, such as highly concentrated inorganic acids and/or highly concentrated halide eluents. Furthermore, the increase in stability enables the use of eluents having widely varying concentrations and/or pH as may be required to implement gradient chromatography techniques for metal separation. As previously indicated, a barrier to the use of gradient chromatography in metal (e.g. PGM) separation techniques has been the instability of the solid phase media when subjected to the wide variations in eluent concentration required to implement gradient chromatography for metal separation. Use of a monolithic solid phase body solves this instability issue. Further still, the channel structure in a monolithic solid phase body can be designed and controlled to optimize flow rate and pressure drop across the body, and to optimize and improve extraction, separation and purification efficiency, and decrease metal losses. This can be especially advantageous in metal separation and purification techniques which can involve large liquid volumes, low metal concentrations, long elution times, and high value, rare metals for which losses must be minimized.

For liquid-liquid extraction, metal containing feed solution is mixed with an immiscible liquid extractant in which one or more metal contain species preferentially dissolve. For example, the feed solution may be an aqueous metal containing liquid and the immiscible liquid extractant may be an organic solvent or vice versa. The mixing may be achieved using a distribution plate comprising a plurality of through-holes or nozzles through which the feed solution and extractant liquid are injected into a mixing chamber. The size and distribution of through-holes or nozzles in the distribution plate can be designed to produce droplets of extractant liquid of a desired size. For example, the continuous phase may be added through the centre of the distribution plate and the dispersed phase through a ring with 1 mm nozzles. Droplets of extractant liquid within the feed solution may be of a size 2-3 mm in diameter.

After mixing, the mixed feed solution and extractant are then flowed through a monolithic solid phase body comprising a plurality of channels. Droplets of extractant separated by feed solution pass through the monolith channels. Due to laminar flow, a so-called "slug flow regime" is achieved between the continuous and the dispersed phase. "Slug flow" or "Taylor flow" is known in other applications for achieving enhanced mass transfer kinetics.

After flowing through the monolithic solid phase body, the mixed phase is allowed to settle over a vertical phase separator, which can be made relatively small as this process is designed to give larger droplets compare to the microdroplets which are generated using prior art techniques.

Advantageously, the channels in the monolithic solid phase body may have a diameter of 1 mm or more. This differs from a microchannel configuration which uses submillimetre channel diameters and requires a high pressure drop. In contrast, the monolithic solid phase bodies of the present specification can be designed to have a low pressure drop and a relatively large flow rate while simultaneously improving extraction rates and enhancing metal separation and purification. The present approach doesn't form microdroplets by design and requires a smaller settling area and/or reduced setting time.

Furthermore, the present approach can utilize a range of materials, it can be implemented without moving mechanical parts, and provides a combination of increased rate of separation, improved separation/purification of different metal species, decreased metal losses, increased simplicity and robustness (e.g. reduction and/or no moving mechanical parts), reduced footprint, reduced entrainment, and reduced operating costs.

Multiple liquid-liquid extractions may be performed to achieve multi-component separation of products with high purity. Additionally, or alternatively, a combined solid phase extraction and liquid-liquid extraction may be implemented. This can be done in series or simultaneously. For example, a liquid-liquid extraction may be performed as outlined above in which the channels of the monolithic body are also functionalized to adsorb one or more target metal species. As such, one or more metal species may be extracted from the feed solution to an extractant liquid phase and one or more further metal species may be adsorbed onto the surface of the monolithic body in the channels. Adsorbed metal species may then to desorbed from the solid phase extractant, e.g. by washing with a suitable eluent.

The present specification thus provides an improved method for separating metals by either one or both of liquid-liquid extraction and solid phase extraction using a solid monolithic body comprising a plurality of channels. It should be noted that solid monolithic bodies have been disclosed for use in other applications. For example, monolith technology has been developed and applied to pharmaceutical and biological separation processes (see BIA Separations—http://www.biaseparations.com/). The development and application of methacrylate monoliths to pharma/biopharma applications has also been described in the literature (F. Svec, Ind. Eng. Chem. Res. 1999, 38, 34). However, the specific problems associated with metal refining processes, and the solution to use solid monolithic bodies to address these problems as described herein, has not previously been proposed as far as the inventors are aware.

BRIEF DESCRIPTION OF THE DRAWINGS

For a better understanding of the present invention and to show how the same may be carried into effect, certain embodiments of the present invention will now be described by way of example only with reference to the accompanying drawings, in which.

DETAILED DESCRIPTION

As described in the summary section, the present specification provides an improved method for separating metals in a metal refining process by either one or both of liquid-liquid extraction and solid phase extraction using a solid monolithic body comprising a plurality of channels.

Figure 3:
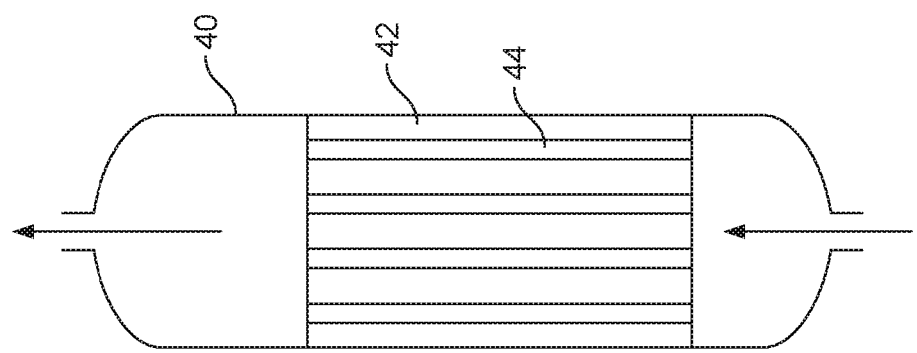
FIG. 3 illustrates a configuration for separating metals in a metal refining process using a solid monolithic body comprising a plurality of channels.

As illustrated in FIG. 3, the method comprises:
injecting a feed solution comprising the metals into a column or flow pipe 40 comprising a monolithic solid body 42 having a plurality of channels 44; and
flowing the feed solution through the plurality of channels 44 in the monolithic solid body 42 to separate the metals.

In FIG. 3, channels 44 in the monolithic body 42 are illustrated as linear, parallel channels for simplicity. However, the channels may be a variety of shapes, sizes, and orientations depending on the requirements of the end application. In certain examples, the channels are formed by an open porous network structure in a single solid phase. Furthermore, in FIG. 3 the column or flow pipe 40 is illustrated in a vertical orientation with feed solution flowing upwards through the monolithic solid body 42. However, the column or flow pipe may be in a variety of orientations and fluid may flow in either direction depending on the requirements of the end application.

The monolithic solid body can be formed by one or more inorganic materials or formed of one or more organic polymer materials. The monolithic solid body may comprise one or more of a methacrylate, a thioether functionalised methacrylate, a glycol, a hydrophilic acrylates, a polystyrene divinyl benzene (PS-DVB) support, and a co-polymer. For example, the monolithic solid body can be a cross linked co-polymer of glycol methacrylate and ethylene glycol dimethacrylate. Alternatively, the monolithic solid body can be a co-polymer of oligo ethylene glycol, glycidyl methacrylate and ethylene glycol di-methacrylate. Yet another possibility is that the monolithic solid body is a polystyrene divinyl benzene polymer with hydrophilic oligo glycols groups covalently attached thereto.

The monolithic solid body can be formed using conventional casting/moulding techniques or by 3D printing which provides a high degree of flexibility in the design and manufacture of different monolithic structures for different metal refining processes and/or different operating conditions. When designing the monolithic structure, and selecting suitable materials for the manufacture of the monolithic structure, factors to consider include: target flow rate; target flow volume; target flow pressure; target residence/retention time; operating temperature; operating pH; variations in one or more operating conditions during operation; chemical composition of the feed solution; and chemical composition of liquid extractants and/or eluents.

While the dimensions and configurations of channels within the monolithic body may be selected and optimized for a particular application, it should be noted that the monolithic structures of the present invention are intended for industrial scale metal refining processes involving large volumes of feed solutions and requiring large flow rates and low pressure drops. As such, each of the channels in the monolithic solid body may have a diameter of 1 mm or more for certain applications. The external dimensions of the monolithic body may be such that the width of the monolithic body (perpendicular to flow direction) is at least 0.1 m, 0.2 m, 0.3 m, 0.5 m, 1 m, 2 m, or more. The maximum width will be dependent on the end process requirements and the manufacturing limitations for fabricating the monolithic body, but may nominally be up to the order of 10 m. The length of the monolithic body (parallel to flow direction) may be at least 0.1 m, 0.2 m, 0.3 m, 0.5 m, 1 m, 2 m, 5 m or more. Again, the maximum length will be dependent on the process requirements and the manufacturing limitations, but may nominally be up to the order of 10 m. It will be appreciated that these industrial scale separators are very distinct in terms of structure, function and end application when compared to, for example, microfluidic devices.

The methodology as described herein may be used in a metal refining process such as a platinum group metal (PGM) refining process or a battery metal refining process. The feed solution may thus comprise one or more platinum group metals or battery metals. Examples of metals included in the feed solution include one or more of the following: platinum, palladium, rhodium, osmium, ruthenium, iridium, silver, gold, cobalt, nickel, lithium, and manganese.

Figure 2:
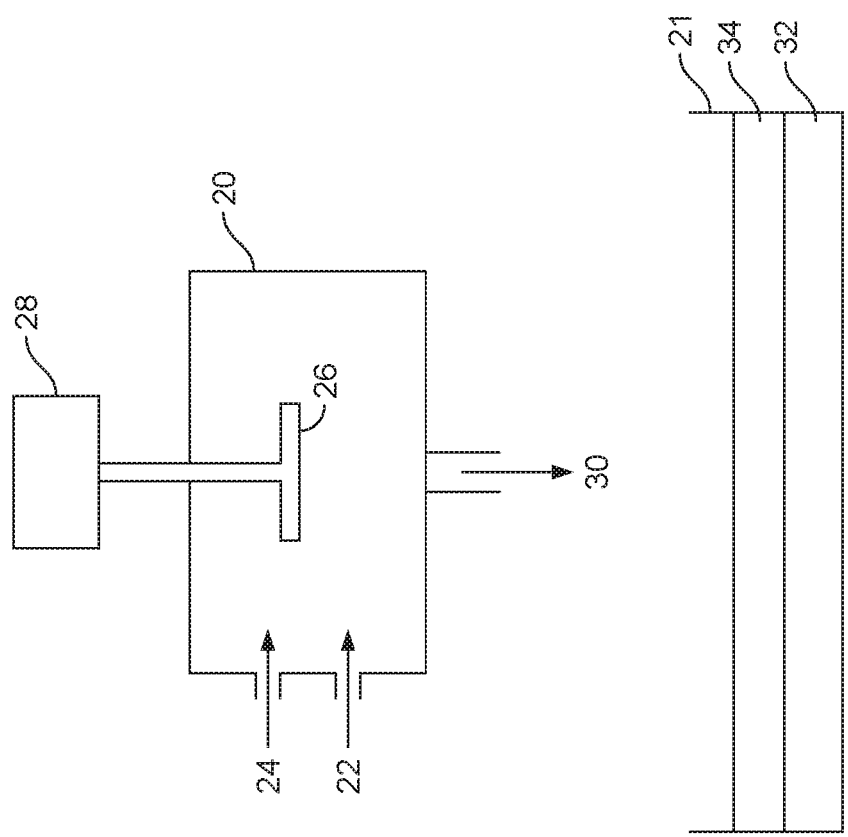
FIG. 2 shows a prior art liquid-liquid extraction configuration comprising a mixing chamber and a settling tank as discussed in the background section.
Figure 1:
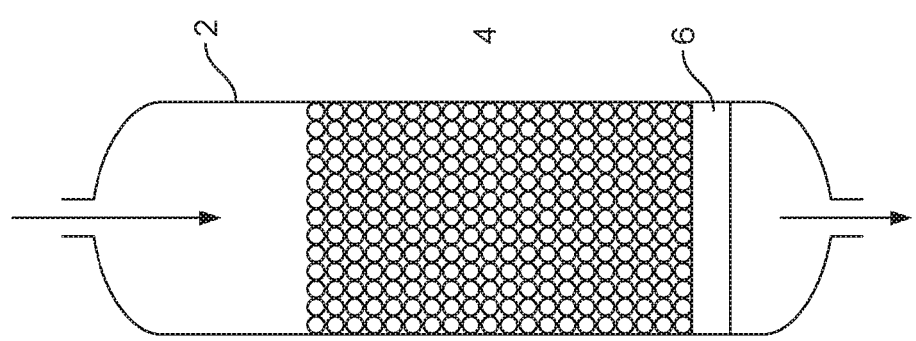
FIG. 1 shows a prior art solid phase extraction configuration comprising a column packed with a granular or beaded solid phase extractant media as discussed in the background section.
Figure 4:
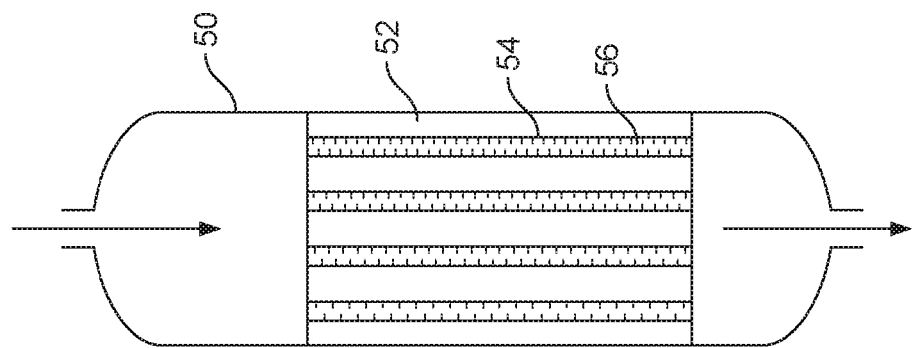
FIG. 4 shows a solid phase extraction configuration comprising a solid monolithic body comprising a plurality of channels.

According to certain examples, and as illustrated in FIG. 4, the method is a solid phase extraction method in which at least one metal species in the feed solution is adsorbed onto a surface of the monolithic solid body within the channels as the feed solution flows through the plurality of channels in the monolithic body in order to separate the metals. As in FIG. 3, a column or flow pipe 50 is provided with a monolithic body 52 comprising channels 54 disposed within the column or flow pipe 50. In a solid phase extraction method, the surface of the monolithic body within the channels 54 may be functionalized 56 to selectively adsorb one or more target metal containing species. Such a method may further comprise eluting the feed from the monolithic solid body in an elution cycle by flowing an eluent through the monolithic solid body. Furthermore, in such a method a concentration of the eluent may be reduced during the elution cycle prior to elution of at least one of the metals, i.e. a gradient chromatography method. As previously indicated, the use of a solid monolithic body comprising a plurality of channels, in place of a packed, powdered, granular, or beaded chromatographic support medium, can improve the stability of the solid phase media in a gradient chromatography method as applied to a metal separation process.

Figure 5B:
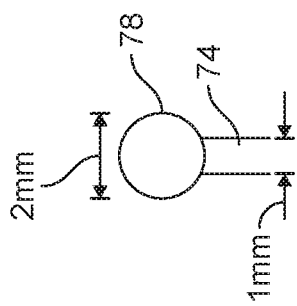
FIGS. 5(a) to 5(c) show a liquid-liquid extraction configuration comprising a distribution plate, a solid monolithic body comprising a plurality of channels, and a vertical separator.
Figure 5C:
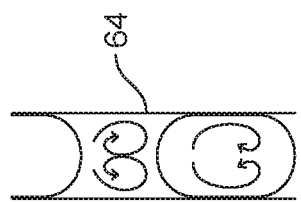
Figure 5A:
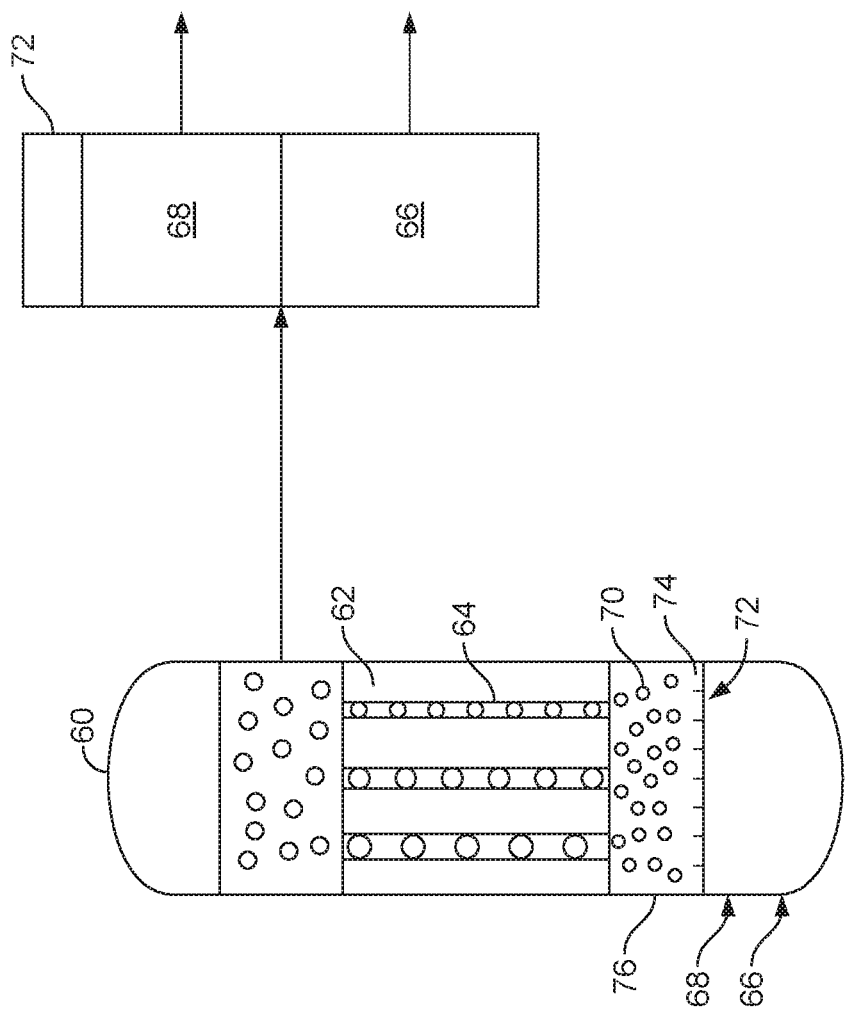

According to certain further examples, and as illustrated in FIGS. 5(a) to 5(c), the method is a liquid-liquid extraction method. As in previous examples, a column or flow pipe 60 is provided with a monolithic body 62 comprising channels 64 disposed within the column or flow pipe 60. Feed solution 66 and immiscible extractant liquid 68 are fed into a lower portion of the column 60 and mixed together. In such a method, the mixture 70 of feed solution and immiscible extractant liquid may comprise droplets (of one of the phases in the other of the phases) having a minimum diameter of 1 mm or more. This may be achieved, for example, by mixing the feed solution 66 with the immiscible extractant liquid 68 using a distribution plate 72 comprising a plurality of through-holes or nozzles 74 through which the feed solution and/or extractant liquid are injected into a mixing chamber 76 prior to the mixture of feed solution and immiscible extractant liquid flowing through the plurality of channels 64 in the monolithic solid body 62. The through-holes or nozzles 74 of the distribution plate can be suitably designed to achieve the desired droplet size 78 as shown in FIG. 5(b). A balance can thus be achieved between providing droplets 78 which are sufficiently small to achieve an effective extraction of metal species from the feed solution into the extractant liquid while providing droplets 78 which are sufficiently large so as to reduce settling time and/or settling area.

The mixture 70 of feed solution and immiscible extractant liquid is then flowed through the plurality of channels 64 in the monolithic solid body 62 to separate the metals with at least one metal species extracting into the immiscible extractant liquid. It is particularly pertinent to note that by using a monolithic body with channels, due to laminar flow, a so-called "slug flow" or "Taylor flow" regime is achieved between the continuous and the dispersed phase and this enhances mass transfer kinetics. FIG. 5(c) shows a portion of a channel/capillary 64 in the monolith illustrating recirculation in the organic and aqueous phases as they pass along the channel/capillary 64 enhancing mass transfer. As such, it is possible to achieve an effective extraction of metal species from the feed solution into the extractant liquid while providing droplets which are sufficiently large so as to reduce settling time and/or settling area. As such, after flowing the mixture 70 of feed solution and immiscible extractant liquid through the plurality of channels 64 in the monolithic solid body 62, the mixture 70 can be passed to a vertical phase separator 72 and allowed to settle in order to separate the immiscible extractant liquid 68 from the feed solution 66 in a more efficient manner.

The present specification thus provides an improved method for separating metals by either one or both of liquid-liquid extraction and solid phase extraction using a solid monolithic body comprising a plurality of channels. The methodology can be applied in a number of different ways including isocratic solid phase extraction, gradient chromatography, and liquid-liquid extraction. Several examples are discussed in more detail below.

Gradient Chromatography

The use of a monolithic solid phase chromatography medium can provide an improved chromatographic method for the separation of platinum group metals from each other and from associated base metal and/or amphoteric elements and/or Au contained in PGM feed solutions. The method comprises:

injecting a feed solution into a chromatography column comprising a monolithic chromatographic support media, the feed solution comprising at least two platinum group metals and at least one base metal and/or amphoteric element and/or Au;

eluting the feed from the column in an elution cycle by flowing an eluent through the column, wherein a concentration of the eluent is reduced during the elution cycle prior to elution of at least one of the platinum group metals.

Starting the elution using a standard, high concentration eluent (e.g. 6 M HCl) enables base metals and insoluble metals (IMs, e.g. Ru, Ir, Ru) to be eluted quickly from the column. Subsequently reducing the concentration of eluent (e.g. to 0.1M HCl) has been found to speed up the elution of later eluting components and also to narrow the elution bands. As such, the time required for the elution cycle is reduced and the concentration of product solutions is increased reducing evaporation requirements. It has also been found that the method reduces the diameter of the required column and enables a wider range of PGM separations to be practically achieved while significantly improving the scale-up economics of such processes.

While gradient chromatography methods have been used in other fields of technology such as pharmaceutical applications, the present inventors are not aware of this problem having been identified before in the field of PGM separation and purification or any indication that such chromatography techniques would be useful in improving such techniques.

In relation to the above, it has been found that it is not straight forward to apply a gradient chromatography technique to PGM separation methods. This is because very concentrated halide eluents are used in such processes (e.g. 6 M HCl). Significantly reducing the concentration of the eluent (e.g. to <1 M HCl) during the elution cycle has been found to de-stabilize the chromatography support media. Typical polymer chromatographic support medias used in PGM separation techniques contract in volume as the concentration of eluent is reduced and this adversely effects retention times and separation of PGM components. This is not a problem using standard PGM separation techniques in which the eluent is maintained at a single concentration during elution (i.e. isocratic). However, it is a barrier to the application of gradient chromatography in PGM separation techniques.

To enable the present PGM separation technique using gradient chromatography, the present specification uses a monolithic chromatography support media comprising a plurality of channels through which the feed solution can flow. Such a configuration improves the distribution and stability of the chromatography support media. The method reduces or prevents shrinking and swelling of the chromatography support media in use for PGM separation when the eluent concentration is changed and allows a gradient separation scheme to be applied in PGM separation methods.

In one approach, starting the elution using a standard, high concentration eluent (e.g. 6 M HCl) enables base metals (note Fe typically elutes after Pt) and insoluble metals (IMs, e.g. Ru, Ir, Ru in a 3+ oxidation state) to be eluted quickly from the column. Reducing the concentration of eluent to <3 M results in Fe and Te eluting with the other bases metals. Subsequently reducing the concentration of eluent (e.g. to 0.1M HCl) has been found to speed up the elution of later eluting components and also to narrow the elution bands.

The eluent can be a halide salt or an acid halide such as HCl, NaCl, or LiCl. The concentration of eluent can be reduced gradually (linear or nonlinear gradient curve) or, more preferably, in a step-wise fashion from a higher concentration of eluent to a lower concentration of eluent. The elution cycle may comprise a single step-wise reduction in the eluent concentration or may comprise two or more step-wise reductions in the eluent concentration. The number, concentration reduction, and timing of the reductions will be dependent on the specific PGM feed composition and desired separation. The elution protocol can be optimized to concentrate later eluting components and shorten overall elution cycle times while maintaining a clear separation of components. Furthermore, the concentration of the eluent can be increased prior to the end of the elution cycle allowing a column regeneration period to bring the column back to a higher eluent concentration before the next feed injection. Typically, the concentration of eluent can be cycled between a higher concentration of at least 5 M (e.g. in a range 5 M to 7 M or 5.5 M to 6.5 M) and a lower concentration of no more than 1 M (e.g. in a range 0.001 M to 1 M).

The gradient chromatography method as described herein can be applied in a number of ways with a variety of PGM and base metal separation methods.

In one example, the feed comprises platinum and one or more of base metal, Rh, Ir, and Ru (with the Rh, Ir, Ru in a 3+ oxidation state). The concentration of the eluent is reduced after elution of the base metal, Rh, Ir, and Ru and prior to elution of the platinum (in a 4+ oxidation state) from the column. The insoluble metal elements Ru and Ir can be reduced to their 3+ oxidation state in a redox potential range of 500 to 550 mV prior to the gradient chromatography method. The feed may comprise both Pd and Pt or only Pt for feeds in which the Pd is absent or has been previously removed. When the feed comprises both Pd and Pt, the concentration of the eluent is reduced after elution of the base metal, Rh, Ir, and/or Ru and prior to or during the elution of the palladium. For example, the concentration of eluent may be reduced prior to the peak of the Pd elution band. The Pd and Pt can be eluted separately or together.

Gold, iron, and any other later eluting impurities may be removed from the feed prior to application of the gradient chromatography method. However, this is not necessary using the presently described methodology which can be applied to feeds containing late eluting impurities such as Au, Fe, and/or Os. This is a key limitation of prior isocratic PGM chromatography methods which require the removal of these species from the feed prior to application of the chromatography method. The present gradient chromatography method does not require the removal of these species from the feed prior to application of the gradient chromatography method. As such, the present method enables feeds with these elements to be treated and thus expands the number and type of PGM feeds which can be processed via chromatography.

The feed can initially be injected as normal in 5.5 M to 6.5 M HCl and after the insoluble metals and base metal have eluted the eluent is switched to a low concentration acid (e.g. less than 1 M and more preferably less than 0.1 M HCl) for elution of the Pt (and Pd if present). The column can then be re-equilibrated with 5.5 M to 6.5 M HCl prior to the next feed injection.

According to another example, the feed comprises Rh and Ir in a 3+ oxidation state and RuNO, and the concentration of the eluent is reduced after elution of the Rh and Ir, and prior to elution of the RuNO from the column. In this example, the Ru is converted to a nitrosyl complex prior to chromatographic separation. The feed may also comprise base metal in which case the concentration of the eluent is reduced after elution of the base metal, Rh and Ir, and prior to elution of the RuNO from the column. The feed may also comprise Pt which is eluted after the RuNO.

According to another example, the feed comprises base metal, Rh in a 3+ oxidation state, Ir in a 4+ oxidation state, and Ru in the form of RuNO, and wherein the concentration of the eluent is reduced prior to elution of the Ir from the column. An oxidant can be added to prevent reduction of the Ir from a 4+ oxidation state to a 3+ oxidation state during elution.

According to yet another example, the feed comprises base metal, osmium one or more of Rh, Ir, and Ru in a 3+ oxidation state, palladium, platinum, and one or more of Fe, Te, Cu, Sn, Os, and Au. The concentration of the eluent is reduced after elution of the base metal, Rh, Ir, and Ru and prior to elution of the Fe, Te, Cu, Sn, Os, and/or Au. The concentration of eluent is then further reduced after elution of the palladium and platinum and prior to elution of the Fe, Te, Cu, Sn, Os, and/or Au. In this case the order of elution of species switches with Fe and Te eluting with Cu and Sn/Os and then Au.

According to yet another example, the feed comprises base metal, PGMs including osmium, at least one amphoteric element, and gold. In this example, the feed is initially loaded in 6M HCl and eluted in the 6M HCl until Pt is removed. The concentration of eluent is then reduce to 0.1 M HCl to elute Fe/Te/Sn/Os then the concentration of eluent is further reduce to water to remove Au.

The gradient chromatography method enables the possibility for separation of Os and Au in a single chromatography step. This negates the requirement for separate Os and Au removal stages as in conventional refining processes. As such, this provides a wider flowsheet benefit and enables PGM process intensification.

The methods as described above can be applied to a variety of polymer supported chromatography media/solid phase used for PGM separation. Examples include XAD7, HW, hydrophilised PS-DVB supports (e.g. ABEC5000), methacrylate or thioether functionalised methacrylate (e.g. the Macroprep range of methacrylate polymers). Suppliers include Dow, Tosoh, and BioRad. However, one problem with this method, as previously discussed, is that significantly reducing the concentration of the eluent (e.g. from 6M HCl to less than 1 M HCl) during the elution cycle has been found to de-stabilize the chromatography support media. Typical polymer chromatographic support medias used in PGM separation techniques contract in volume as the concentration of eluent is reduced and this can adversely affect retention times and separation of PGM components. To enable the PGM separation technique using gradient chromatography, in accordance with the present specification a monolithic body comprising a plurality of channels is formed using, for example, one or more of the aforementioned materials.

The polymeric chromatographic support media may comprise one or more of a methacrylate, a glycol, a hydrophilic PS-DVB support, and a co-polymer. For example, the polymeric chromatographic support media can be a cross linked co-polymer of glycol methacrylate and ethylene glycol dimethacrylate. Alternatively, the polymeric chromatographic support media can be a co-polymer of oligo ethylene glycol, glycidyl methacrylate and ethylene glycol di-methacrylate. Yet another possibility is that the polymeric chromatographic support media is a polystyrene divinyl benzene polymer with hydrophilic oligo glycols groups covalently attached.

It will be evident from the above that the gradient chromatograph methods described herein provide a significant improvement over isocratic methods for a range of chromatography support media and for a range of PGM feed compositions. For example, when using a thioether functionalised methacrylate support media and a PGM feed comprising insoluble metal, platinum, and palladium, elution of species is significantly improved by applying a gradient chromatography method. The gradient chromatography method also can extend the scope of chromatography media which can be used for a particular PGM feed composition.

Gradient Elution with Insoluble Metal (IM), Pd, and Pt Separation

A solid phase chromatography media can be prepared using a hydrophilic methacrylate polymer produced by the polymerisation of glycidyl methacrylate, oligo ethylene glycol and pentaerythritol dimethacrylate. A test feed solution can be prepared containing 16 g $L^{-1}$ Cu from copper(II) chloride, 9 g $L^{-1}$ Ir(III) from $Na_2[IrCl_6]^{2-}$, 49 g $L^{-1}$ Pd from $Na_2[PdCl_4]^{2-}$, 65 g $L^{-1}$ Pt(IV) from chloroplatinic acid (CPA), 36 g $L^{-1}$ Rh(III) as $RhCl_3$ and 7.4 g $L^{-1}$ Ru(III) as $Na_3[RuCl_6]^{2-}$.

The solid phase media can be introduced into a 10 mm diameter column with a media height of 30 cm. The column head piece and inlet frit are adjusted to meet the top of the solid phase media before executing the rest of the sequence. A high-performance liquid chromatography (HPLC) pump is employed in order to control pressure on the column.

A 1 ml volume of the mixed PGM feed is injected and eluted according to the sequence below with a step acid concentration change during the cycle of 6 to 0.1 M after 16 minutes. The flow rate is maintained at 2.3 mL $min^{-1}$ during the experiment.

|        | Eluent         | Time (min) |
|--------|----------------|------------|
| Step 1 | Feed Injection | 0.4        |
| Step 2 | 6M HCl         | 16         |
| Step 3 | 0.1M HCl       | 28         |
| Step 4 | 6M HCl         | 16         |

Figure 6:
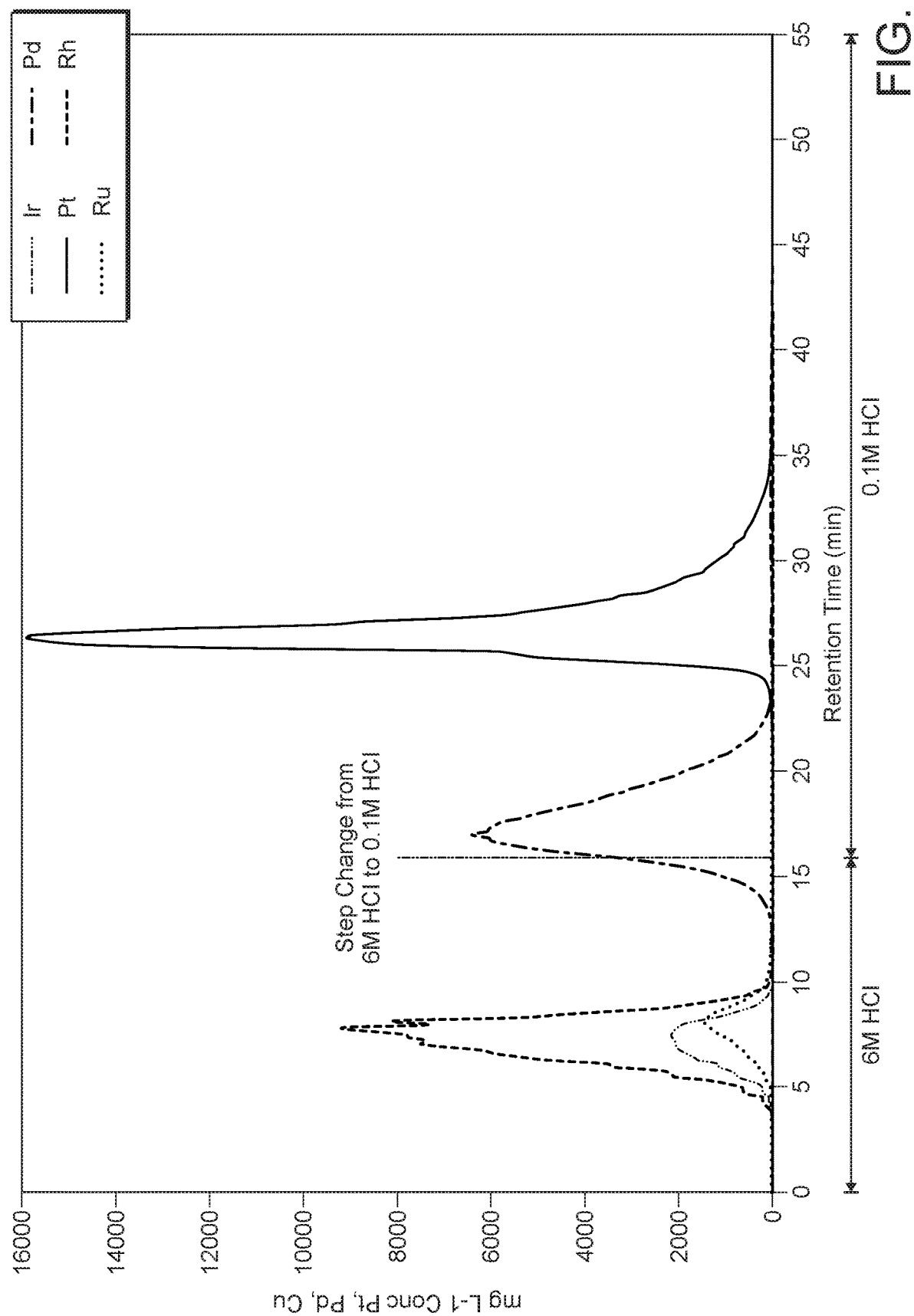
FIG. 6 shows a chromatogram illustrating separation of insoluble metals and Cu from Pd and Pt including a 6 M HCl elution phase and a 0.1 M HCl elution phase—the chromatogram exhibits a more concentrated Pt band compared to isocratic elution and a shorter elution cycle time while maintaining a clear separation between the Pd and Pt.

The chromatogram obtained (FIG. 6) shows clear separation of the insoluble metals and Cu from Pd during the 6 M HCl elution phase. The 0.1 M HCl elution exhibits a more concentrated Pt band compared to isocratic elution and a shorter elution time resulting in an improved overall cycle time. Clear separation between the Pd and Pt is maintained.

Isocratic Elution with Insoluble Metal (IM), Pd, and Pt Separation (Comparative Example)

Figure 7:
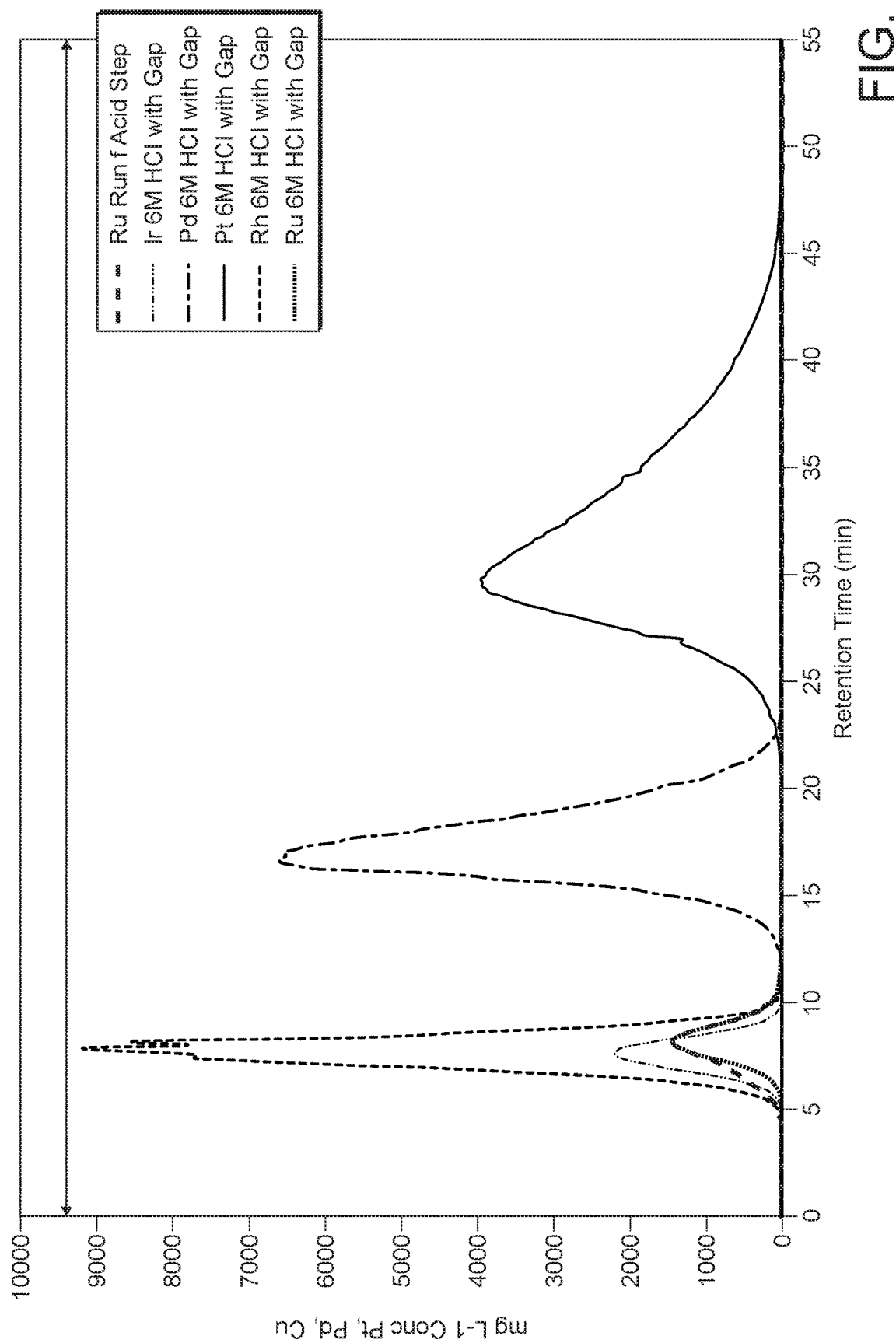
FIG. 7 shows a chromatogram for a separation method corresponding to that for FIG. 6 but with the HCl eluent maintained at 6 M for the whole elution cycle—the chromatogram exhibits a much longer Pt tail region without the step gradient resulting in a more dilute Pt band and a longer elution cycle time.

The same column as described in example 1 is injected with 1 ml of the same feed at 2.3 mL $min^{-1}$. The eluent is maintained at 6 M for 55 minutes with no step change in concentration applied. The chromatogram (FIG. 7) exhibits a much longer Pt tail region without the step gradient resulting in more dilute Pt band and lower productivity per cycle.

Figure 8:
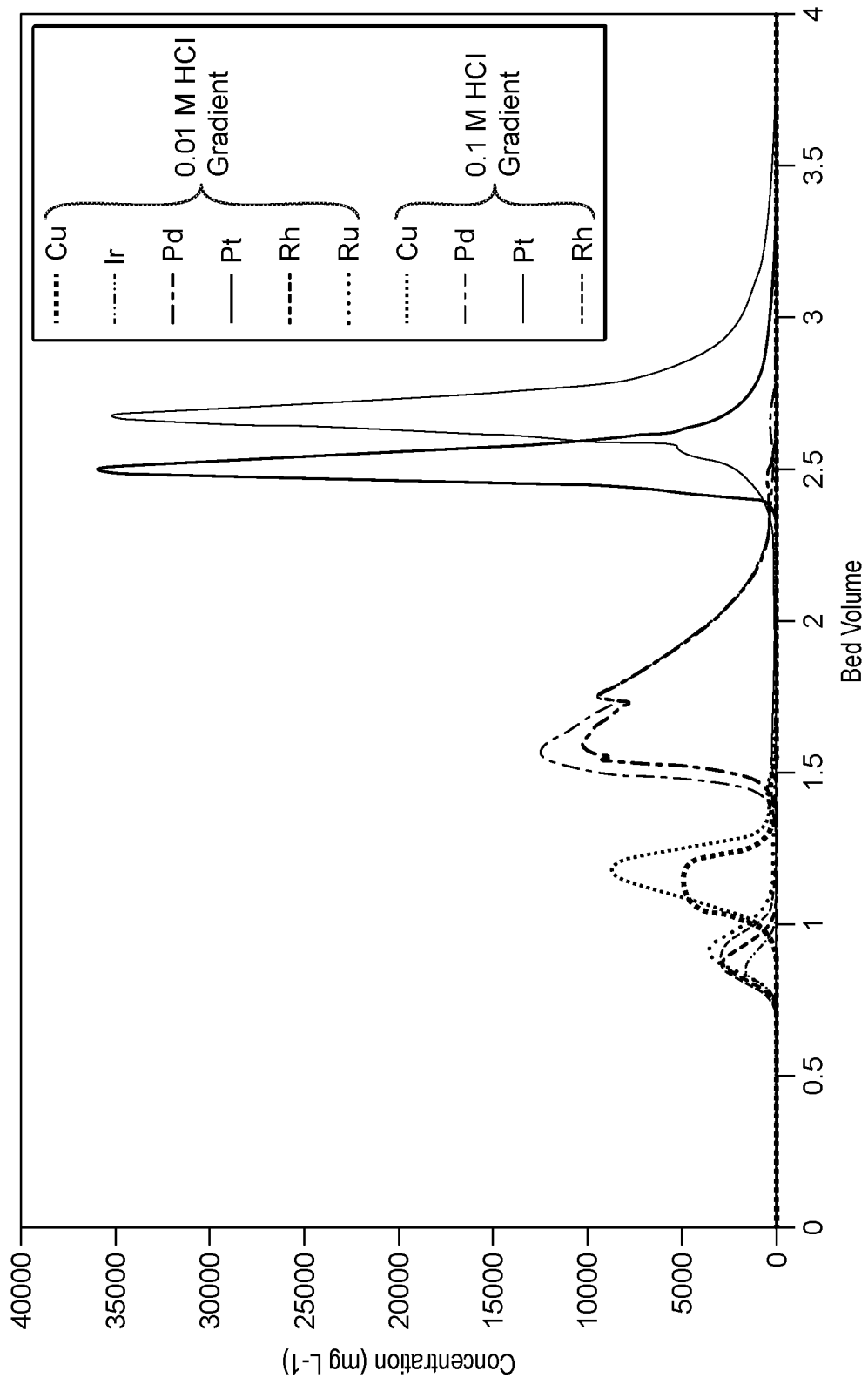
FIG. 8 shows a chromatogram illustrating separation of insoluble metals and Cu from Pd and Pt including: (i) a 6 M HCl elution phase and a 0.1 M HCl elution phase (dotted line); and (ii) a 6 M HCl elution phase and a 0.01 M HCl elution phase (solid line)—the 0.01 M chromatogram exhibits a more concentrated Pt band and a shorter elution cycle time compared to the 0.1 M chromatogram while still maintaining a clear separation between the Pd and Pt.

Gradient Elution of Insoluble Metal (IM), Pd, and Pt with a 0.01 M Step Acid Gradient In this experiment the concentration of the acid step gradient is reduced by an order of magnitude to 0.01 M[H+] with successful Pt elution and a better peak shape. This reduces cycle time and gives a more concentrated product Pt fraction. FIG. 8 shows a chromatogram illustrating separation of insoluble metals and Cu from Pd and Pt including: (i) a 6 M HCl elution phase and a 0.1 M HCl elution phase (dotted line); and (ii) a 6 M HCl elution phase and a 0.01 M HCl elution phase (solid line). The 0.01 M chromatogram exhibits a more concentrated Pt band and a shorter elution cycle time compared to the 0.1 M chromatogram while still maintaining a clear separation between the Pd and Pt.

Effect of Repeated Step Elution Cycles

Figure 9:
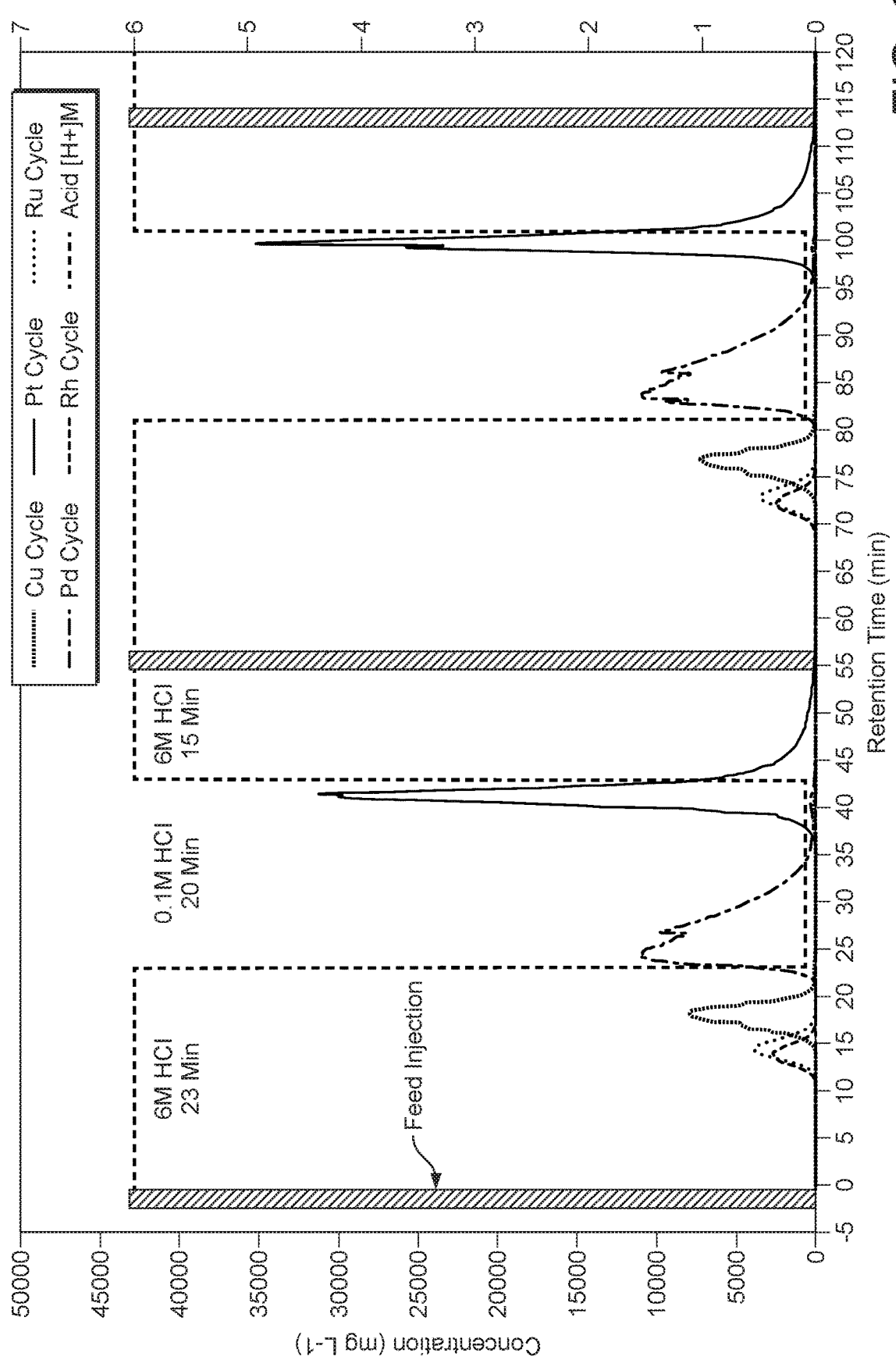
FIG. 9 shows a chromatogram in which injection of PGM feed is repeated automatically with an HCl eluent concentration gradient cycle from 6 M to 0.1 M repeating and allowing a column regeneration period to bring the column back to 6 M HCl before the next feed injection.

FIG. 9 shows a chromatogram in which injection of PGM feed is repeated automatically with an HCl eluent concentration gradient cycle from 6 M to 0.1 M repeating and allowing a column regeneration period to bring the column back to 6 M HCl before the next feed injection.

Gradient Elution of Pd Free Feed

Figure 10:
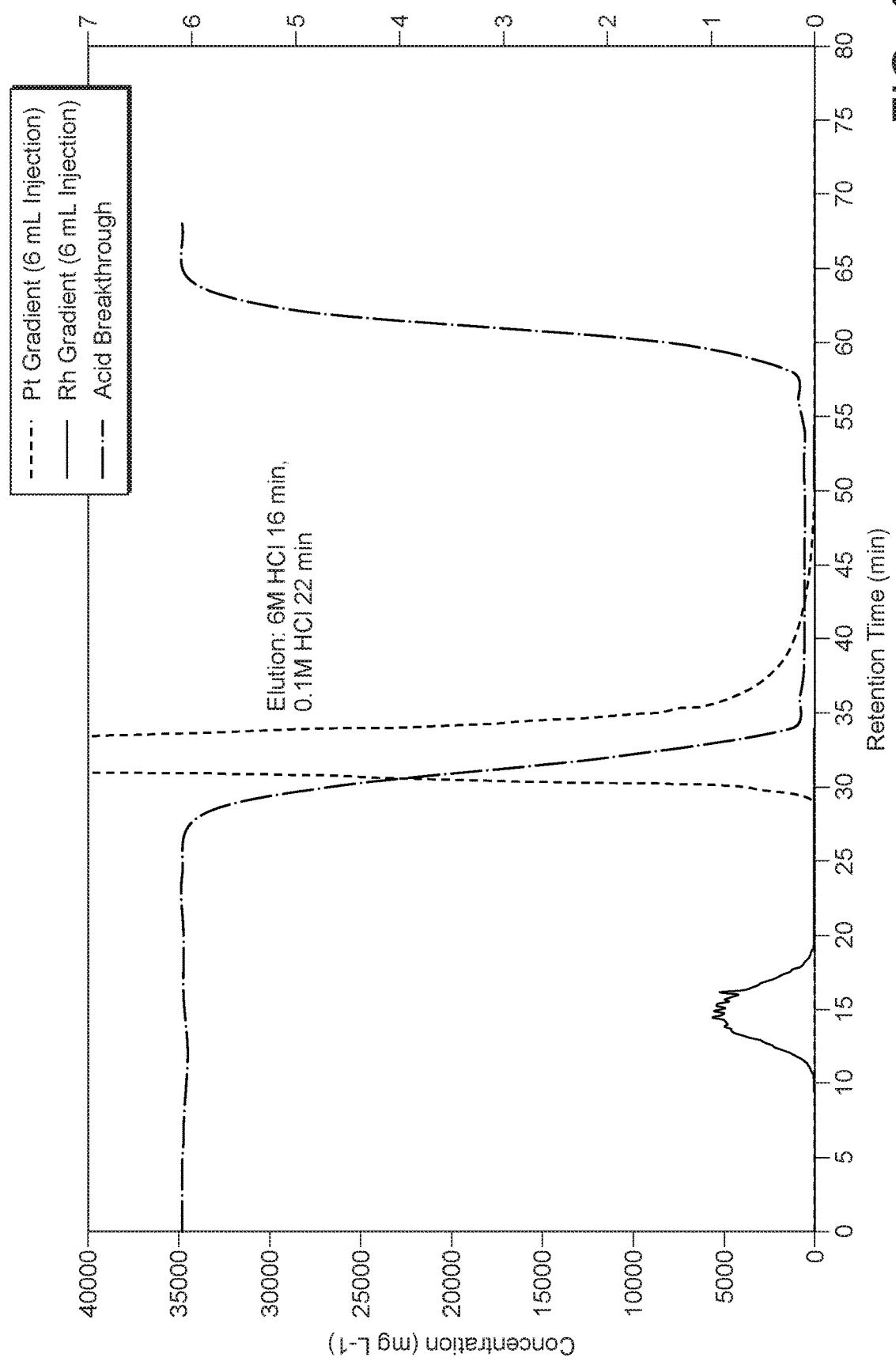
FIG. 10 shows a chromatogram illustrating the application of the gradient method to greatly improve the efficiency of the chromatographic Pt separation for feeds where Pd has previously been removed—the method gives significantly shorter cycle times and much better product concentration than a standard isocratic method.

FIG. 10 shows a chromatogram illustrating the application of the gradient method to greatly improve the efficiency of the chromatographic Pt separation for feeds where Pd has previously been removed. The method gives significantly shorter cycle times and much better product concentration than a standard isocratic method.

RuNO Separation from the Other Insoluble Metals

A feed solution is prepared comprising Rh and Ir in the 3+ oxidation state and Ru in the form of RuNO via nitrosylation. Reduction in concentration of the eluent during elution is implemented to provide a more concentrated RuNO band when compared to an isocratic separation of the RuNO from the Rh and Ir. This provides an improved RuNO separation from the other insoluble metals.

Ir(IV) Separation from the Other Insoluble Metals and RuNO

A feed solution equivalent to the previous example is prepared and then oxidized to convert the Ir to the 4+ oxidation state. Reduction in concentration of the eluent during elution is implemented to accelerate Ir(IV) elution after elution of the RuNO. This provides an improved Ir(IV) separation from the other insoluble metals and RuNO.

Multiple Step Gradient Method for Separating PGMs and Gold

A feed solution is prepared comprising base metal, insoluble metals, palladium, platinum, and gold. The base metal and insoluble metals are eluted using 6 M HCl, the palladium and platinum are eluted with 1 M HCl, and the gold is eluted with 0.01 M HCl or water. This method provides an opportunity for a continuous process to separate PGM and gold/amphoteric metals.

Multiple Step Gradient Method for Separating PGMs Including Osmium and Gold

A feed solution is prepared comprising base metal, insoluble metals, palladium, platinum, osmium and gold. The base metal and insoluble metals are eluted using 6 M HCl, the palladium and platinum are eluted with 1 M HCl, and the osmium and gold are eluted with 0.01 M HCl or water. This method provides an opportunity for a continuous process to separate PGM and gold/amphoteric metals. This method provides an opportunity for enhanced osmium productivity.

Ion Exchange, Solid Phase Extraction, and Chromatography Processes

Current ion exchange, solid phase extraction, and chromatography processes for metal separation/purification rely on particulate/beaded materials of various particle sizes and morphologies. The particulate/beaded nature of these solids (either spherical, or irregular materials) imposes physical constraints and limitations on such processes. For example, limiting the operating pressure which restricts the flow rates that can be applied. In practice, this limits the flow rate and throughput that can be achieved and often requires the use of specialised and sometimes expensive column hardware. Membrane technology is another approach which has been used to overcome the restrictions of packed beds, but membranes have limited capacity for adsorption of metals. The implementation of ion-exchange/sold phase capture processes also requires complex column hardware for operation.

In normal metal ion exchange and solid phase extraction processes, particulate solid phases made either of polymer or silica are used. These are functionalised with a specific functional group to target the metal/class of metal required. Particles must then be packed into column to ensure efficient adsorption and capture of the target metals. Solutions containing the target metal can be flowed through the packed bed containing the beads. The packing processes and inherent particulate nature of the beads results in blind channels and variability in available reactive surface area due to a certain amount of surface area being inaccessibly to fluid flowing through the packed bed. This can lead to lower available reactive surface areas and lead to resistance to flow and back pressure in the system.

In accordance with the present specification, monolith's can be manufactured to possess an open porous network structure in a single solid phase. This structure eliminates the interparticle void space of beaded materials in packed beds and so increases the available surface area and significantly reduces the back pressure during operation. This allows much higher flow rates and therefore significantly greater throughput.

The monolith materials can be any polymer type that is suitable for use in aggressive metal extraction processes and can be formed in a solid phase by polymerisation inside a mould or cast to achieve a single continuous solid phase of the porous material. Examples include methacrylates, acrylates, and polystyrene divinyl benzene. The polymer however needs to possess a hydrophilic surface to work well in aqueous environments. This can be achieved either by starting with hydrophilic monomers or by starting with a material that is hydrophobic (e.g. PS-DVD) and post treating the formed monolith with a hydrophilic chemical group.

Thus, in accordance with one aspect of the present specification, hydrophilic polymer monoliths can be provided for the separation, purification and recovery of metals, particularly for the processing and recovery of critical and precious metal elements. In these examples, a monolithic material made from a hydrophilic polymer (for example polymethacrylate, PEG derivatised PS-DVB) is used for the separation and purification of metals, such as the separation and purification of PGM/PM (platinum group metal/precious metal) elements as well as automotive vehicle battery critical elements such as cobalt, nickel, and lithium.

The hydrophilic polymer monolith, which is single solid phase which exhibits an open porous structure, can be made by carrying out a polymerisation within a cast to generate a porous polymeric material of a desired shape rather than as discrete particles or beads. A cylindrical pillar or annulus shape is preferred in certain applications for favourable flow characteristics, but other shapes are possible depending on the application. A monolith prepared in an annulus shape has been used for test purposes.

Porous hydrophilic monolithic polymers can be prepared by established literature procedures (e.g. polymerisation moulding) or obtained from a commercial supplier. Such porous hydrophilic monolithic polymers are reacted with a suitable chemical/functional group/ligand that is known to be selective for a particular PM/PGM element over other elements. A solution containing the desired PM/PGM is then, after adjustment to the optimum conditions for separation, flowed through the functionalised monolith leading to selective adsorption/binding of the desired element to the monolith to form a loaded monolith, whilst other undesired impurities pass through. The PM/PGM element can then be recovered from the monolith by passing another solution through the loaded monolith to adjust the chemistry and recovery the element at high purity/yield.

As an example of the aforementioned methodology, a thioether functionalised monolith has been fabricated by the reaction of a hydrophilic glycidyl methacrylate polymer (polyGMA) monolith with 1-thioglycerol to produce a palladium selective monolith, which in initial tests successfully extracted and recovered Pd from an acid solution showing high capacity and quantitative recovery. Further examples include a weak base amine functionalised methacrylate monolith for rhodium/iridium separation and recovery, a hydroxylated monolith for gold recovery, and functionalised monoliths for Ni and Co recovery from Li battery waste materials.

Methacrylate polymers for PGM separations have already been described in the literature: WO 2004/019071 describes a thioether methacrylate media in beaded form to separate Pt and Pd; WO 2003/093515 describes the separation of Rh, Ru, Ir and Pt using a methacrylate solid phase with various amine groups; and F. L. Bernardis, University of Strathclyde PhD thesis 2002, describes the synthesis and use of thioether methacrylate polymers for Pd recovered. The development described in the present specification is the fabrication of porous monolithic bodies from such polymers for use in PM/PGM and vehicle battery element recovery. Furthermore, methodologies have been developed for functionalizing monolithic bodies such that they are suitable for such metal extraction applications. For example, during development of a Pd capture monolith (described as an example later in this specification) a new flow chemistry method was developed to attach thioglycerol to a polyGMA monolith using mild reaction conditions to attach the thioether group in situ to a commercial monolith inside its housing.

Monolithic bodies can provide a continuous solid phase of a given material/polymer with an open porous structure. There are no discrete particles and therefore no interparticle void channels. Accordingly, the resistance to fluid flow can be made significantly lower than in packed beds, i.e. much higher flow rates/throughput can be achieved. A porous network also allows fast mass transfer. As such, monoliths combine the capacity advantages of a packed bed column with the flow advantages of a membrane, and provide significant cost/space advantages as well as flexibility in operations and ease of use. The single solid phase of the monolith prepared by casting, moulding, or 3D printing also removes the need for expensive column hardware, further reducing the capital and operating cost of metal recovery processes compares to existing packed bed techniques. This is of particular advantage in PM/PGM applications, where materials of construction requirements for harsh corrosive environments can place severe limitation on column technology.

As previously indicated with respect to gradient chromatography, another known problem with beaded polymers, particularly for PM/PGM recovery, is that in practice suitable polymers have been found to be susceptible to swelling and contraction when the liquid changes pH from acid to water to base. The fixed continuous nature of a monolith can solve this problem and also overcome this constraint in other low pH applications such as base metal separation and recovery from automotive battery materials and waste streams (e.g. Li, Ni, Mn, and/or Co recovery).

In the area of precious metal and/or critical metal element recovery, the monolith technology as described herein can be envisaged as analogous to removable inline filter units that can be placed in a process stream or pipe. Also, in process applications, monoliths can provide compact systems capable of fast capture and recovery. A series of such monoliths targeting different elements can be stacked together in sequence to achieve a complete separation of a complex mixture of metal species, for example Au/Pd/Ir/Pt, in an intensified separation.

Monolithic solid bodies can thus provide an intensified process compared to standard packed bed systems in a metal refinery. A monolith-based metal recovery process can have higher capacities, smaller footprint, and greater flexibility for metal recovery, particularly for precious metals, platinum group metals, and battery materials including lithium, nickel, cobalt and manganese.

In certain worked examples, hydrophilic monoliths have been made from polyglycidylmethacrylates (polGMA). These are copolymers of glycidyl-methacrylate and polyethyleneglycoldimethacrylates of various chain lengths and sizes. This polymer material has significant advantages as a monolith support. Methacrylate's have been shown to be very resistant to strong acids and bases compared to silica. They are also much more hydrophilic then normal polystyrene divinyl benzene (PS-DVB) polymers used in most industrial ion-exchange resins. PolyGMA also provides a simple chemistry to attach a functional group to by acid/base catalysed epoxide ring opening reactions.

Figure 11:
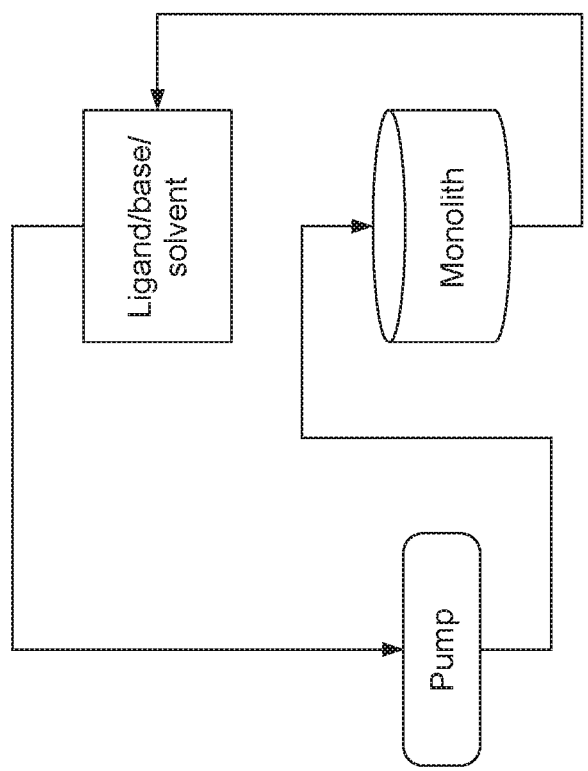
FIG. 11 shows the procedure for functionalising a preformed monolith for solid phase metal extraction—the reaction can be performed by flowing reagents through the monolith at flow rates to allow sufficient residence time for the reaction to take place with unreacted reagent being recycled and re-used.

Target functional groups can be attached to the surface of the polymer material by treating the epoxide group from the poly(GMA) surface of the formed monolith body with the desired group. If the monolith is preformed and is in a housing, the reaction can be performed by flowing the reagents through the monolith at flow rates to allow sufficient residence time for the reaction to take place. The reagent can be cycled back around to the reagent pot for efficient use of reagent. The procedure for functionalising a preformed monolith is illustrated in FIG. 11.

Practical examples of monolith preparation for various metal separations are described below.

Preparation of a Thioether Derived Monolith (for Pd Recovery)

Figure 12:
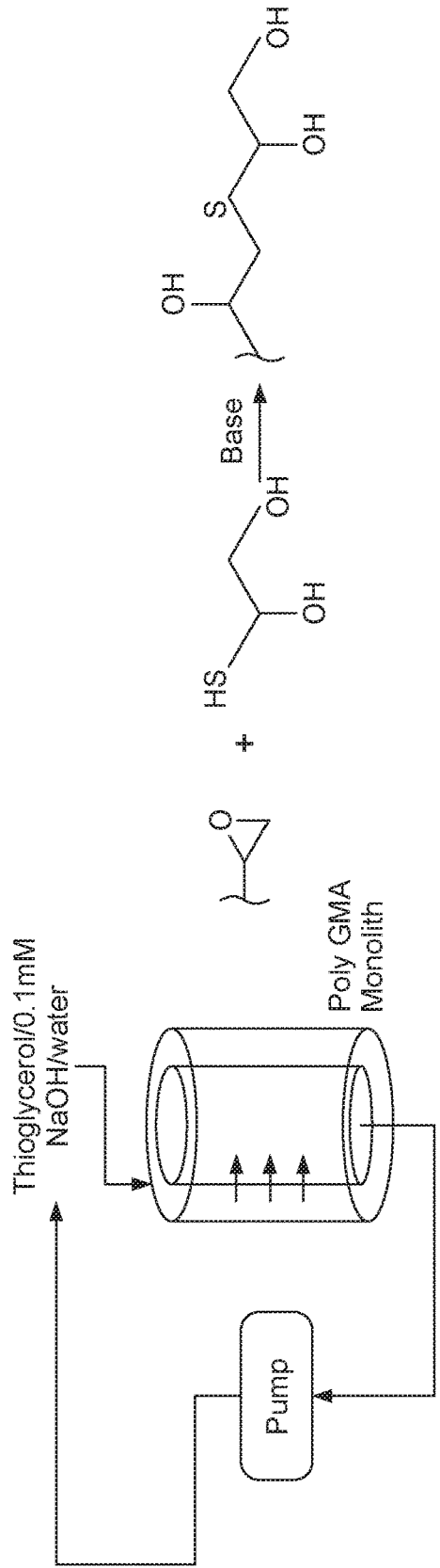
FIG. 12 shows the preparation of a thioether derived monolith for use in palladium recovery.
Figure 13:
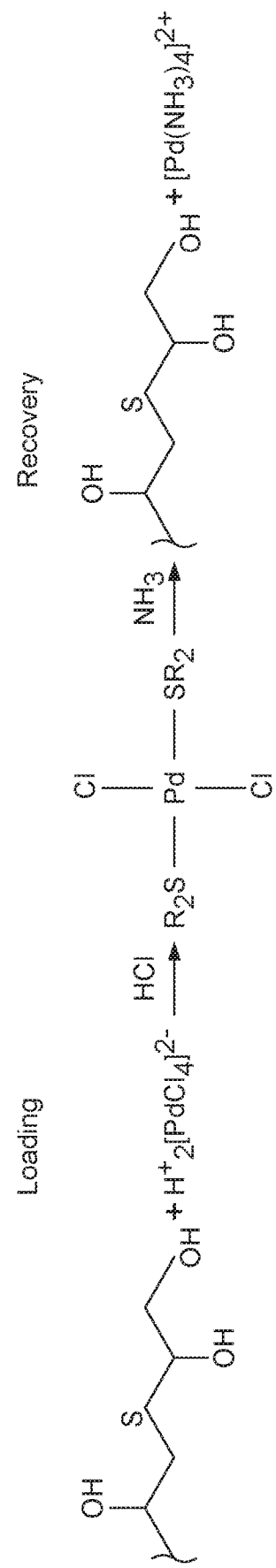
FIG. 13 shows the chemistry for loading and recovery of palladium using the thioether functionalized monolith.

The preparation of a thioether derived monolith and its use in palladium recovery has been successfully demonstrated. The preparation of the thioether derived monolith is illustrated in FIG. 12. The thioether monolith was prepared using a 0.1 mM NaOH base in water and thioglycerol as the thioether ligand. High yield and easy conversion was achieved. During Pd recovery tests, the outlet from the monolith can be monitored by either collecting samples (fractionation) from the outlet flow and subsequently analysing each sample by ICP-OES (inductively coupled plasma optical emission spectrometry), or alternatively by connecting the outlet of the column to an ICP-OES instrument operating in time resolved mode (TRS). The palladium was successfully retained by the thioether grafted monolith and recovered back into aqueous by passing an ammonia solution through the column. The chemistry for loading and recovery of the palladium using the functionalized monolith is illustrated in FIG. 13.

Preparation of a Hydroxylated Monoliths and Gold Recovery Example (for Au Capture)

Figure 14:
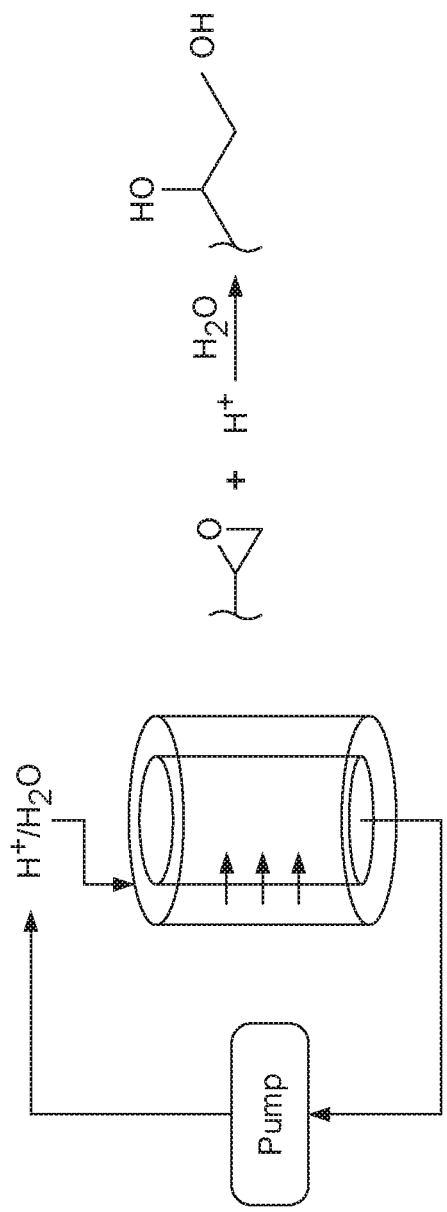
FIG. 14 shows the preparation of a hydroxylated monolith for use in gold recovery.
Figure 15:
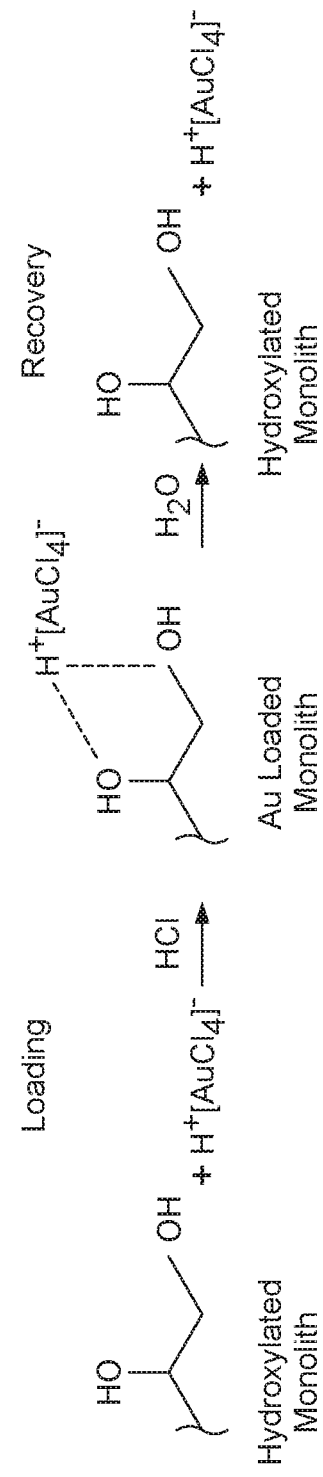
FIG. 15 shows the chemistry for loading and recovery of gold using the hydroxylated monolith.

Preparation of a hydroxylated monolith is illustrated in FIG. 14. Acid catalysed ring opening of epoxide is known, and in this work has been achieved by using a new flow chemistry method to functionalize a monolith as illustrated. Gold can be recovered by passing a solution containing gold in 3-6 M HCl to bind the gold to the hydroxyl monolith and then after washing with 6 M HCl solution the gold can be recovered by passing water (alcohol/ketone water mixture)

through the column. The chemistry for loading and recovery of the gold using the functionalized monolith is illustrated in FIG. 15.

Preparation of Weak Base Amine Monoliths (for Ir and Pt Recovery)

Figure 16:
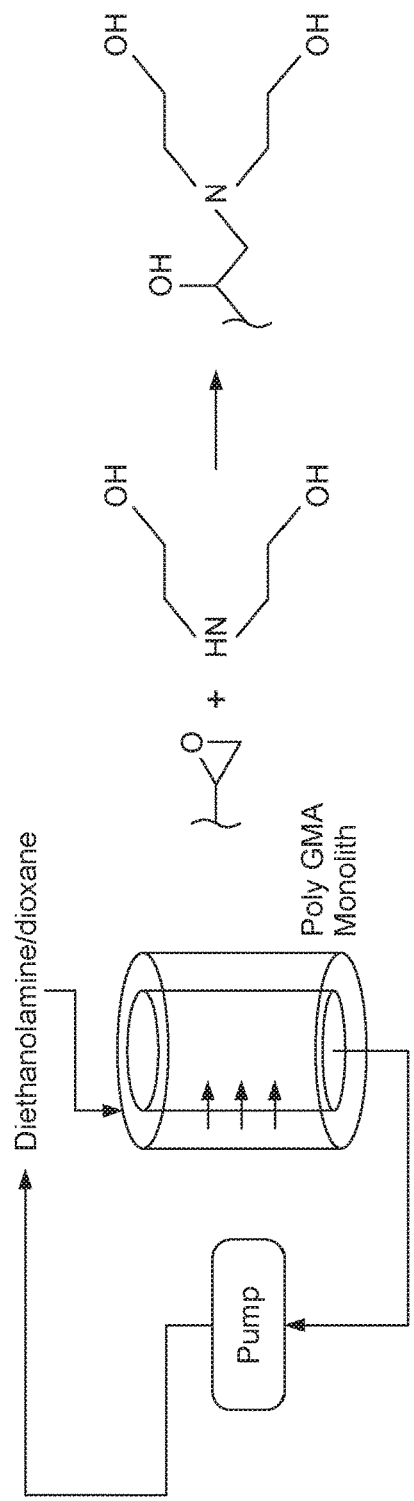
FIG. 16 shows the preparation of a weak base amine monolith for use in iridium and platinum recovery.
Figure 17:
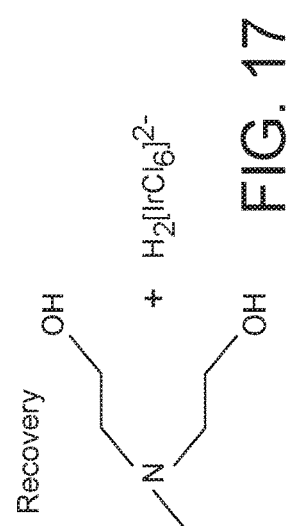
FIG. 17 shows the chemistry for loading and recovery of iridium and platinum using the weak base amine monolith.
Figure 17:
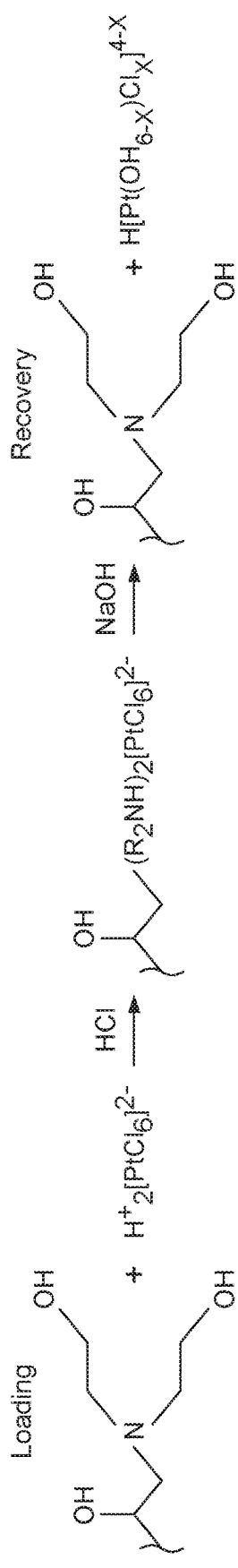
Figure 17:
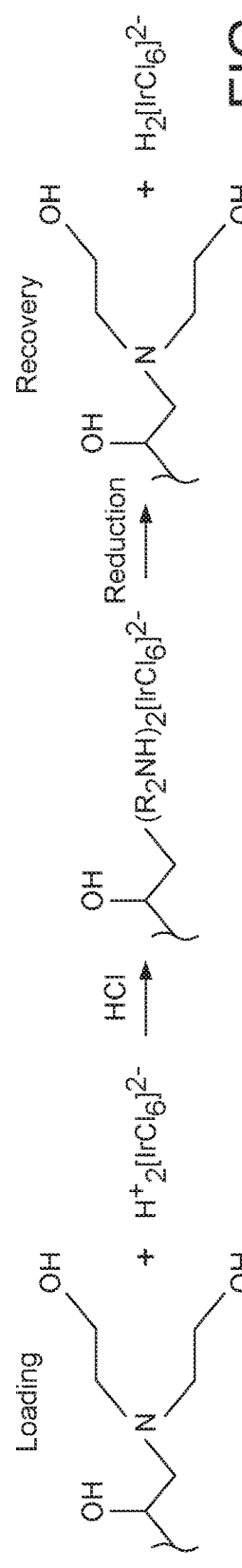

In this example a known amine group, diethanolamine, that is selective for Ir(IV) and Pt(IV), is attached to a monolith by flowing through the monolith in a suitable solvent (e.g. dioxane). Preparation of such a weak base functionalized monolith is illustrated in FIG. 16. Ir(IV) and Pt(IV) can be recovered separately or together by passing a 3-6 M HCL solution of these elements through the column and then recovering the iridium by passing a reductant through the column (e.g. ascorbic acid acid). Platinum is recovered by passing a sodium hydroxide solution through the loaded monolith. The chemistry for loading and recovery of Ir and Pt using the functionalized monolith is illustrated in FIG. 17.

Each of the aforementioned functionalized monoliths can be stacked together in a sequence for multi-metal separation processes depending on the composition of the feed solution.

3D Printed Polymer Monoliths

This aspect of the present specification applies a new technique for the synthesis of hydrophilic polymers (for example polymethacrylate, PEG derivatised PS-DVB) using vat photopolymerisation 3D printing technology. The hydrophilic polymer, which is single solid phase, can be made by carrying out a polymerisation with a liquid solution containing photo-initiator and suitable polymeric precursors in a 3D printer to generate a solid polymeric material of a desired shape rather than as discrete particles or beads. A cylindrical pillar or annulus shape is preferred for certain applications favourable flow characteristics, but other shapes are possible depending on application requirements.

An example has been demonstrated by 3D printing poly (GMA-co-DEGDMA). The 3D printed polymer monolith has been characterised and confirmed by 13C solid State NMR and FT-IR.

3D printed acrylate polymers have been reported previously in the literature. However, to the inventor's knowledge, the use of 3D printed hydrophilic polymer solid phases has not been reported for metal extraction applications such as BM/PGM separation and purification.

3D printed polymers provide a continuous solid phase of a given material/polymer. As such, they can exhibit the advantages previously discussed for monoliths manufactured using moulding or casting techniques. There are no particles and therefore no interparticle void channels. The resistance to flow is thus significantly lower than in packed beds (i.e. much higher flow rates/throughput can be achieved). The porous network, which can be tuned by varying the pixel size of the 3D printer, can allow fast mass transfer. 3D printed monoliths also combine the capacity advantages of a packed bed column with the flow advantages of a membranes and provide significant cost/space advantages as well as flexibility in operations and ease of use. The single solid phase prepared by 3D printing removes the need for expensive column hardware further reducing the capital and operating cost of a metal recovery process when compared to existing packed bed techniques. This is of particular advantage in PM/PGM/BM applications where materials of construction requirements for harsh corrosive environments can place severe limitation on column technology. 3D printed polymer monoliths have also been found to address the previously discussed problem that beaded polymers for PM/PGM/BM recovery have been found to be susceptible to swelling and contracting when the liquid changes pH from acid to neutral to base. The fixed continuous nature of the 3D printed monolith alleviates this problem and also overcomes this constraint in other low pH metal extraction applications.

In certain examples applied to the recovery of precious metals, a 3D printed polymer monolith can be used as a removable inline filter unit that can be placed in a process stream or pipe. In process applications, the 3D printed monoliths provide compact systems capable of fast capture and recovery. A series of such 3D printed monoliths targeting different elements can be stacked together in sequence to achieve a complete separation of a complex mixture, for example Au/Pd/Ir/Pt, in an intensified separation.

3D printed polymer monoliths can also be used for the recovery of critical metal elements used in automotive batteries e.g. Li, Ni, Co, and Mn. For example, functionalised 3D-printed polymers can be used for recovery of Ni and Co at low pH.

3D printed monolith technology has been demonstrated and characterized for methacrylates used in metal recovery applications.

Picolylamine Functionalised 3D Printed Poly(GMA-Co-DEGDMA) Monolith for Copper Extraction As an example of the fabrication and use of a 3D printed and functionalized solid polymer monolith for metal extraction, a picolylamine functionalised 3D printed poly(GMA-co-DEGDMA) monolith has been fabricated and tested for copper extraction as discussed below.

Figure 18:
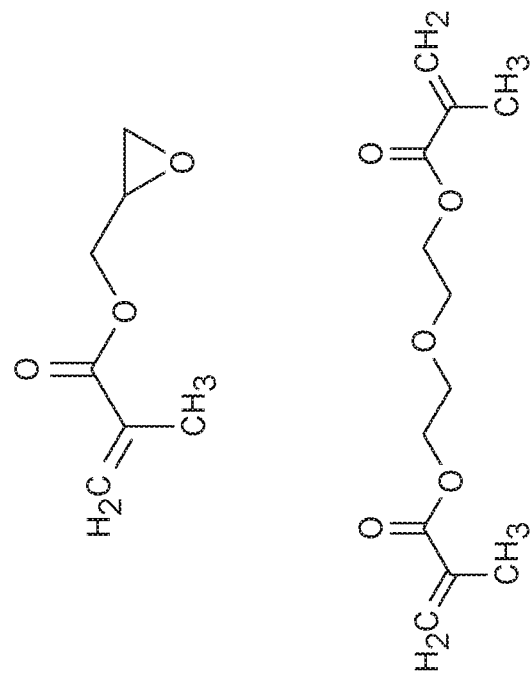
FIG. 18 shows monomers used to fabricate an example of a solid monolithic body by 3D printing: glycidyl methacrylate (GMA, top); and diethylene glycol dimethacrylate (DEGDMA, bottom)

FIG. 18 shows the monomers used to fabricate the 3D printed monolith: glycidyl methacrylate (GMA, top); and diethylene glycol dimethacrylate (DEGDMA, bottom). The monomers were used in the ratio GMA:DEGDMA=1.82:1. A commercially available photoinitiator (FT1 supplied by Resyner Technologies Ltd) was used for the fabrication process using these monomers. A light blocker was not used in this formulation.

The components for the formulation were weighed sequentially into a vessel and mixed. The proportions of each component for the formulation are listed in the table below:

| GMA (g) | DEGDMA (g) | FT1 (g) | FT1 (wt %) |
|---|---|---|---|
| 50.0 | 38.4 | 5.6 | 6.0 |

Figure 19A:
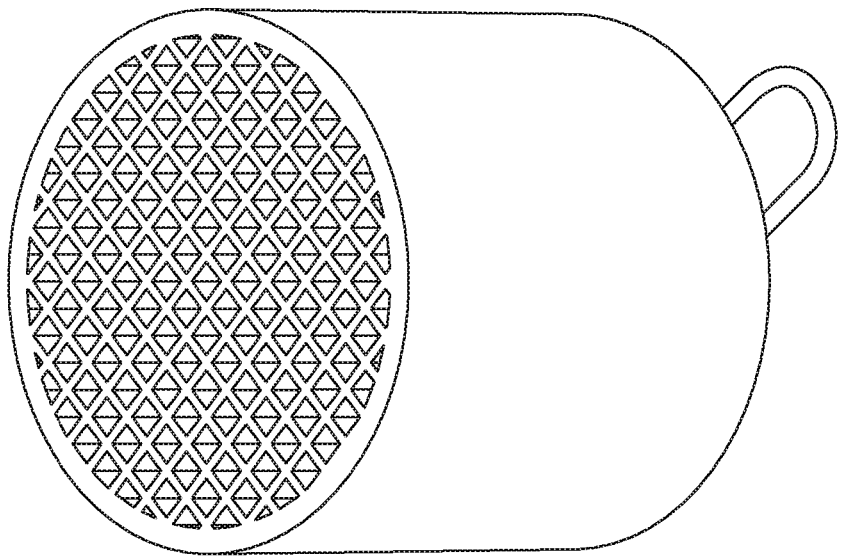
FIG. 19 shows monolith structure shapes generated by software for 3D printing of solid monolithic bodies.
Figure 19C:
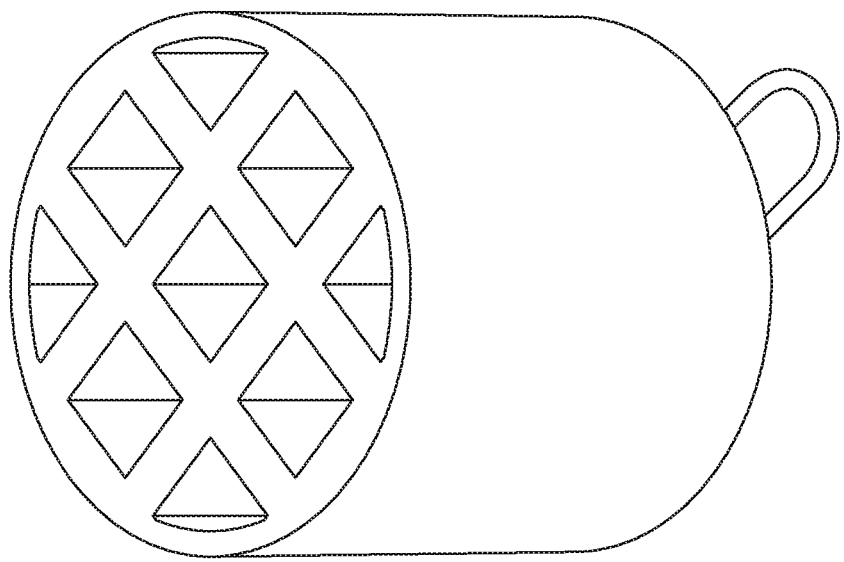
Figure 19B:
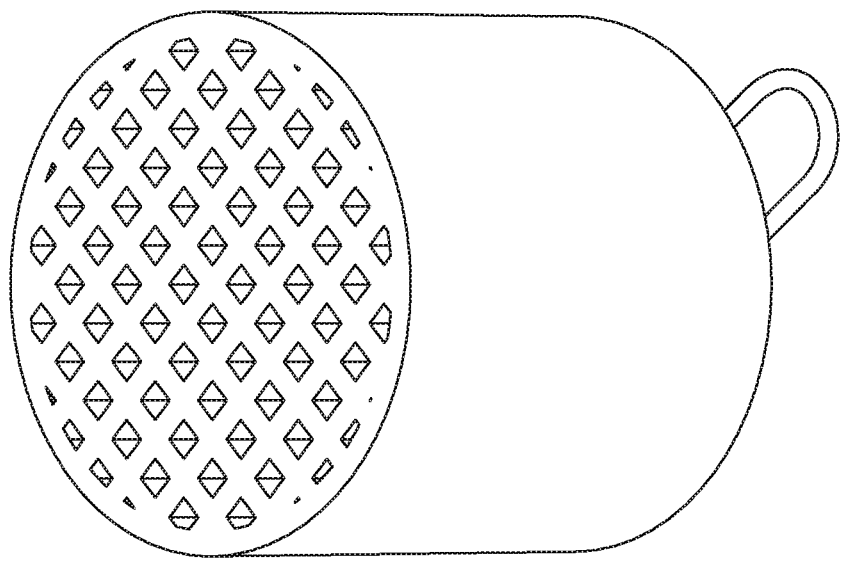

FIG. 19 shows monolith structure shapes generated by software for 3D printing of solid monolithic bodies. 3D shapes were generated using the software Blender v2.69. Lattice structures were created with the software nTopology Elements. Shapes chosen for initial testing were straight walled monolith structure shapes shown in FIG. 19: shape (a) comprises a 0.2 mm wall thickness and a 0.5 mm channel width; shape (b) comprises a 0.5 mm wall thickness and a 0.5 mm channel width; and shape (c) comprises a 1.0 mm wall thickness and a 2.0 mm channel width. The 3D shape files generated in the aforementioned software packages were then transferred into a 3D printer software. Shape (c) in FIG. 19 was used in this test formulation example.

Curing feasibility was tested using a Fujifilm Dimatix DMP 2800 inkjet printer with a UV LED attachment (365 nm and 395 nm LEDs) as a light source to expose the formulation to test the feasibility of curing. The 395 nm light source was calibrated for emission at 405 nm to compare directly to 3D printing equipment. Curing feasibility was confirmed.

3D printing of the formulation to form the solid monolithic structure of FIG. 19(c) was then performed. A Tethon Corporation Inc Bison 1000 vat photopolymerisation additive layer manufacturing (VP-ALM) 3D printer was used for this example. 50 base layers were selected with 60 second exposure per base layer. Layer thickness was 100 µm. After printing, the monolith was removed, washed with 2-propanol, and then dried. In order to ensure that the curing reaction was complete, the monolith was placed in a UV curing chamber and irradiated with a 16 W, 405 nm LED light array.

Figure 20:
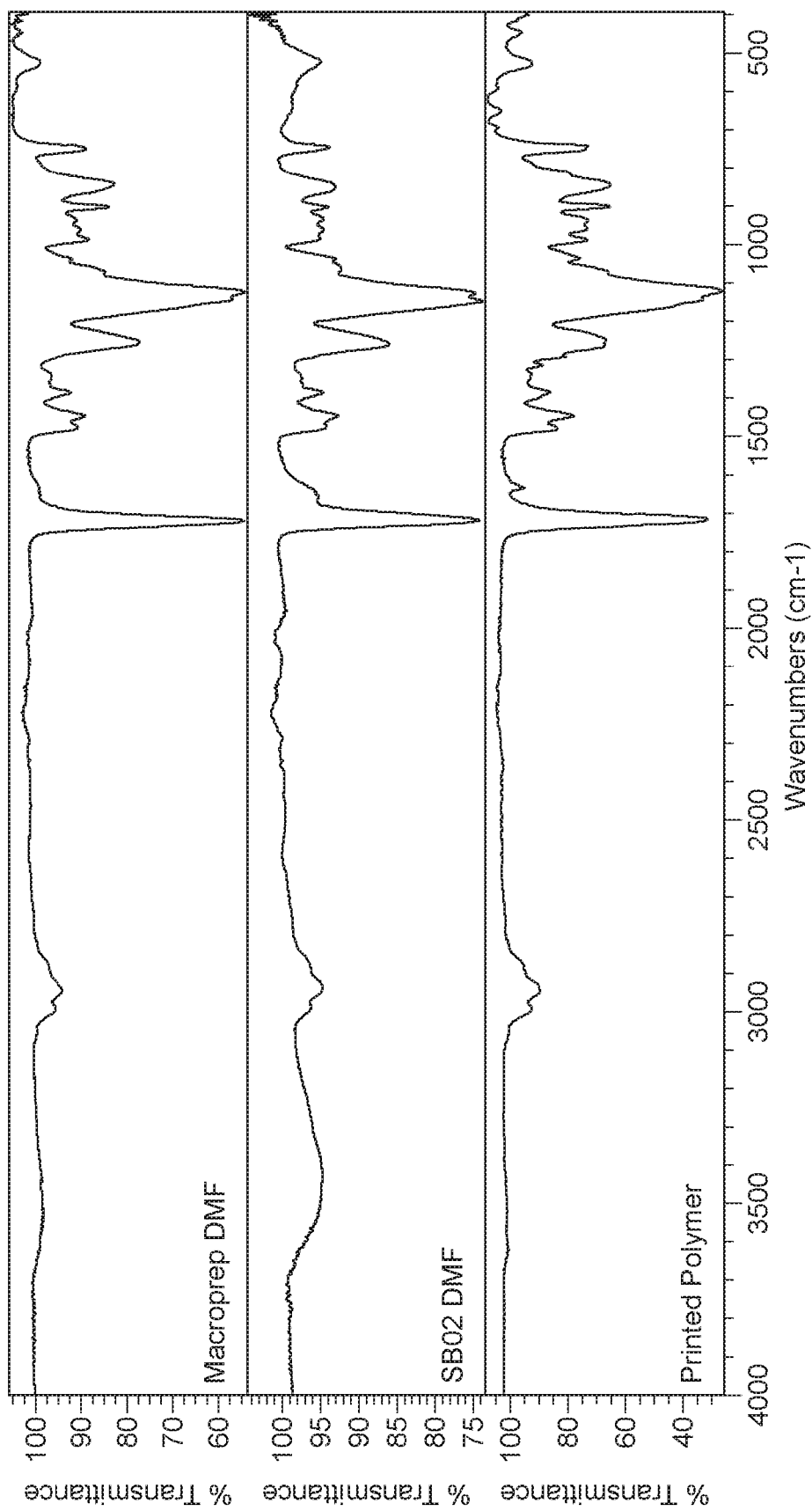
FIG. 20 shows FTIR spectra for: (i) a commercial microporous polymer resin material formed from the monomers of FIG. 18 via a traditional suspension polymerisation process route (top); (ii) a thermally-cured copolymer of the monomers (middle); and (iii) a 3D printed, photo-cured GMA/DEGDMA copolymer of the monomers (bottom)

To determine that the 3D printed polymer retained the epoxide functionality required for picolylamine functionalisation, FTIR measurements were performed and compared to a commercial microporous polymer resin material (Macroprep™ epoxide supplied by Bo-rad) formed from the same monomer components but via a traditional suspension polymerisation process route. This is confirmed by the reproduction of the peaks in the 900-1000 cm$^{-1}$ region. FIG. 20 shows the FTIR spectra for: (i) the commercial microporous polymer resin material as supplied (top); (ii) the thermally-cured copolymer (middle); and (iii) the 3D printed, photo-cured GMA/DEGDMA copolymer fabricated as described above (bottom).

Figure 21:
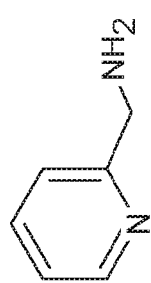
FIG. 21 shows the reaction for picolylamine functionalisation of a 3D printed, photo-cured GMA/DEGDMA copolymer monolith.
Figure 21:
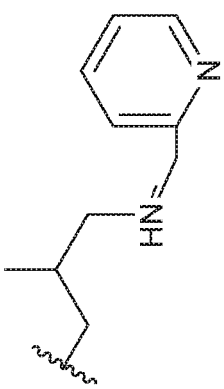

The 3D printed monolith was then functionalised. FIG. 21 shows the reaction for picolylamine functionalisation. The 3D printed, photo-cured GMA/DEGDMA copolymer monolith (2.5 g) was added to a solution of picolylamine (1.5 g) in dioxane. The solution was gently agitated at reflux for 18 hours. When the concentration of unreacted picolylamine in the supernatant solution reached a constant level, indicating that no further reaction was occurring, the supernatant solution was decanted, and the monolith body rinsed with acetone. The monolith was then further washed by Soxhlet extraction with acetone for 8 hours. The final weight of the picolylamine functionalised, 3D printed monolith was 3.87 g (a 39% mass gain).

Metal absorption testing of the picolylamine functionalised, 3D printed monolith was performed with copper solution. The picolylamine functionalised monolith was added to a 20 ml solution of 200 ppm Cu (copper sulfate at pH 2). After gentle agitation for 2 hours, the monolith was removed from the solution, washed with water, and then dried overnight a 50° C. The monolith surface displayed distinct blue coloured region visibly indicating successful copper adsorption. ICP OES analysis of the copper solution before and after contact with the monolith showed a copper loading of 2.97 mg per g of monolith.

Liquid-Liquid Extraction

Several examples of applications of monoliths in solid phase extraction techniques have been outlined above. However, as indicated earlier in this specification, monolith technology has also been found to be advantageous for the liquid-liquid extraction of metal species from a feed solution. The basic methodology has already been outlined with reference to FIGS. 5(a) and 5(b).

Feed solution is mixed with an immiscible extractant liquid and the mixture of feed solution and immiscible extractant liquid is flowed through the plurality of channels in the monolithic solid body to separate the metals with at least one metal species extracting into the immiscible extractant liquid. In such a method, the mixture of feed solution and immiscible extractant liquid may comprise droplets (of one of the phases in the other of the phases) having a minimum diameter of 1 mm or more. This may be achieved, for example, by mixing the feed solution with the immiscible extractant liquid using a distribution plate comprising a plurality of through-holes or nozzles through which the feed solution and/or extractant liquid are injected into a mixing chamber prior to the mixture of feed solution and immiscible extractant liquid flowing through the plurality of channels in the monolithic solid body. The through-holes or nozzles of the distribution plate can be suitably designed to achieve the desired droplet size. A balance can thus be achieved between providing droplets which are sufficiently small to achieve an effective extraction of metal species from the feed solution into the extractant liquid while providing droplets which are sufficiently large so as to reduce settling time and or settling area. By using a monolithic body with channels, due to laminar flow, a so-called "slug flow" or "Taylor flow" regime is achieved between the continuous and the dispersed phase and this enhances mass transfer kinetics. As such, it is possible to achieve an effective extraction of metal species from the feed solution into the extractant liquid while providing droplets which are sufficiently large so as to reduce settling time and/or settling area. As such, after flowing the mixture of feed solution and immiscible extractant liquid through the plurality of channels in the monolithic solid body, the mixture can be passed to a vertical phase separator and allowed to settle in order to separate the immiscible extractant liquid from the feed solution in a more efficient manner.

Figure 22:
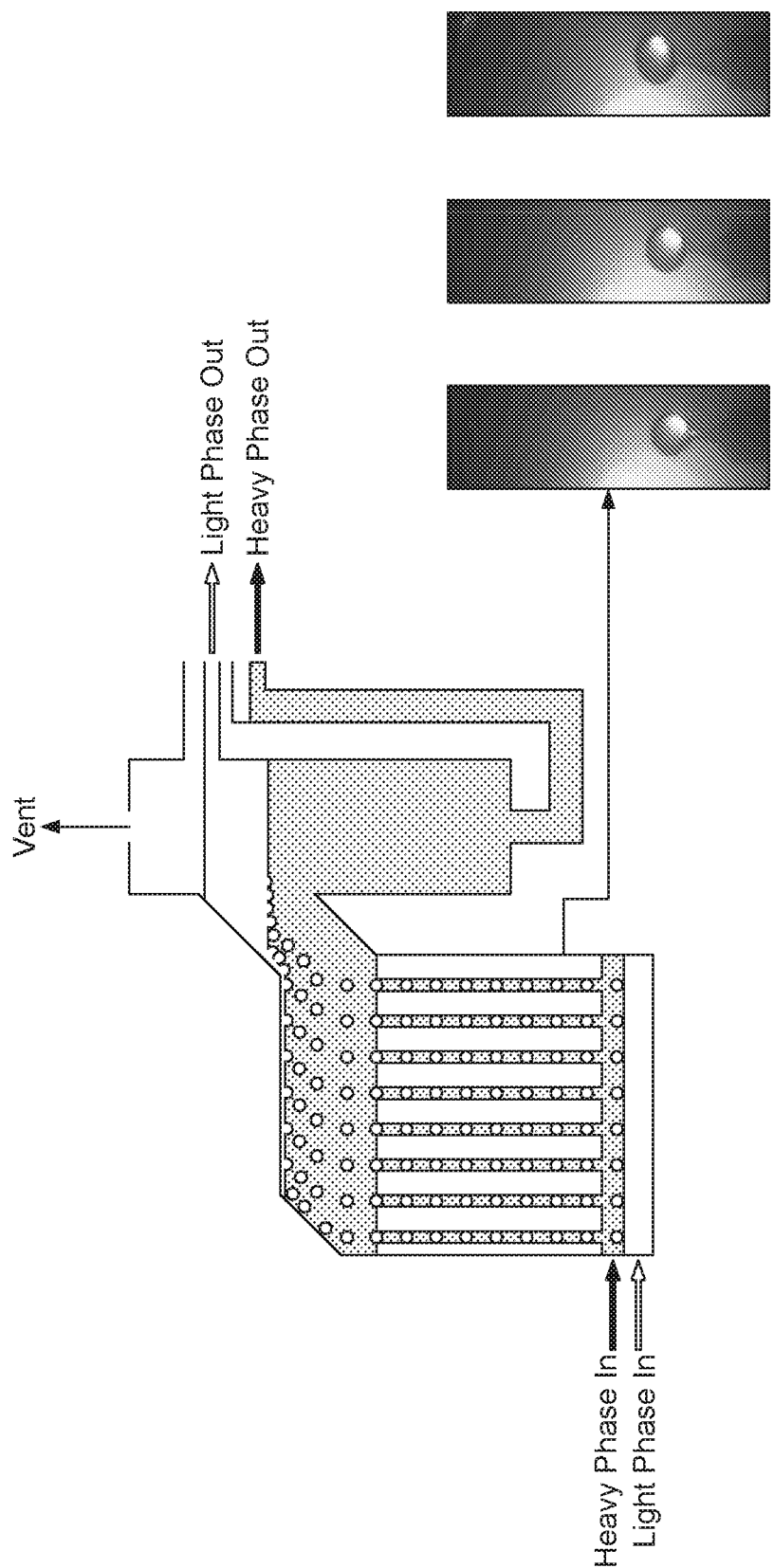
FIG. 22 shows an example of a liquid-liquid extraction configuration comprising a distribution plate, a solid monolithic body comprising a plurality of channels, and a vertical separator, with the distribution plate designed to provide a controlled droplet size of a light (e.g. organic) extractant liquid phase in a heavy (e.g. aqueous) feed liquid phase.

FIG. 22 shows an example of a liquid-liquid extraction configuration comprising a distribution plate, a solid monolithic body comprising a plurality of channels, and a vertical separator, with the distribution plate designed to provide a controlled droplet size of a light (e.g. organic) extractant liquid phase in a heavy (e.g. aqueous) feed liquid phase. The nozzles or through holes in the distribution plate may have a diameter of: at least 0.1 mm, 0.5 mm, or 1 mm; no more than 5 mm, 3 mm, or 2 mm; or within a range defined by any combination of the aforementioned lower and upper limits. The droplets produced by such nozzles or through holes may have a diameter of: at least at least 0.5 mm, 1 mm, or 2 mm; no more than 10 mm, 7 mm, 5 mm, or 3 mm; or within a range defined by any combination of the aforementioned lower and upper limits. For example, the through hole or nozzle size may be of the order of 1 mm in diameter forming droplets of the order of 2 mm in diameter.

The distribution plate can be spaced apart from the solid monolithic body in order to form a mixing zone or mixing chamber between the distribution plate and the solid monolithic body. In order to ensure sufficient mixing of the feed and extractant liquids between the distribution plate and the solid monolithic body, the distribution plate and solid monolithic body may be separate by a distance of: at least 1 cm, 2 cm, 3 cm, 5 cm, or 10 cm; no more than 50 cm, 30 cm, 20 cm, 10 cm, 5 cm, or 3 cm; or within a range defined by any combination of the aforementioned lower and upper limits (e.g. 2 to 3 cm). The precise dimensions of the apparatus will be dependent on application requirements and production scale.

The material used to form the solid monolithic body may be one of the materials previously disclosed for the solid phase extraction examples. However, since in this liquid-liquid extraction example the solid monolithic body is not required to be functionalized in order to selectively adsorb one or more target metal species, a wider range of materials may be utilized including ceramics and polymers such as Polyether ether ketone (PEEK). The material must still be selected to be resistant to the aggressive chemicals (e.g. strong acids) used in metal extraction processes. As such, materials which are resistant to strongly acidic conditions are preferred for many metal extraction processes. The materials may also be selected and/or functionalized according to their wettability to optimize flow conditions within the channels, to enhance mass transfer kinetics, and/or to increase or reduce adhesion of species on the channel walls.

For this liquid-liquid extraction example, the channels may have a significantly different geometry to the channels which are used in the solid phase extraction examples. For example, channels may be larger in diameter and/or may form discrete flow paths, e.g. a plurality of parallel channels as illustrated rather than an interconnected porous network of channels. The surface area of the channels may not be required to be as large as for solid phase extraction examples and the geometry of the channels can be tailored to achieve "slug flow" or "Taylor flow" rather than to provide a large surface area for adhesion of metal species as in the solid extraction phase examples.

While this invention has been particularly shown and described with reference to certain examples, it will be understood to those skilled in the art that various changes in form and detail may be made without departing from the scope of the invention as defined by the appended claims.

The invention claimed is:

1. A method for separating at least two metals from each other in a metal refining process, wherein the metals include at least one platinum group metal, the method comprising:
   injecting a feed solution comprising the metals in HCl into a column or flow pipe comprising a monolithic solid body having a plurality of channels, wherein the monolithic solid body is a single, continuous, bonded, solid body comprising the plurality of channels through which the feed solution can flow; and
   flowing the feed solution through the plurality of channels in the monolithic solid body to separate the metals,
   wherein the method is a solid phase extraction method in which at least one metal species in the feed solution is adsorbed onto a surface of the monolithic solid body within the channels in order to separate the metals as the feed solution flows through the plurality of channels in the monolithic solid body,
   wherein the surface of the monolithic solid body within the channels is functionalized to selectively adsorb one or more target metal containing species, and
   further comprising eluting the feed from the monolithic solid body in an elution cycle by flowing an eluent through the monolithic solid body, wherein the eluent is HCl,
   wherein the monolithic solid body is formed of an organic polymer material and the surface of the monolithic solid body within the channels is hydrophilic,
   wherein the monolithic solid body comprises one or more of: a methacrylate; a thioether functionalised methacrylate; a glycol; an acrylate; a polystyrene divinyl benzene; a cross linked co-polymer of glycol methacrylate and ethylene glycol dimethacrylate; a co-polymer of oligo ethylene glycol, glycidyl methacrylate and ethylene glycol di-methacrylate; a polystyrene divinyl benzene polymer with hydrophilic oligo glycols groups covalently attached thereto, and
   wherein the surface of the monolithic solid body within the channels comprises hydroxyl groups.

2. The method according to claim 1, wherein the monolithic solid body is formed by 3D printing.

3. The method according to claim 1, wherein each of the channels in the monolithic solid body has a diameter of 1 mm or more.

4. The method according to claim 1, wherein a concentration of the eluent is reduced during the elution cycle prior to elution of at least one of the metals.

5. The method according to claim 1, wherein a width of the monolithic body perpendicular to flow direction is between 0.1 m and 10 m and a length of the monolithic body parallel to flow direction is between 0.1 m and 10 m.

* * * * *